(12) United States Patent
Yamauchi et al.

(10) Patent No.: US 10,554,325 B2
(45) Date of Patent: Feb. 4, 2020

(54) RECEIVER AND RECEIVING METHOD

(71) Applicant: FUJITSU LIMITED, Kawasaki-shi, Kanagawa (JP)

(72) Inventors: Tomohiro Yamauchi, Kawasaki (JP); Takahito Tanimura, Yokohama (JP); Takeshi Hoshida, Kawasaki (JP); Rafael Puerta Ramirez, Kgs. Lyngby (DK)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/117,396

(22) Filed: Aug. 30, 2018

(65) Prior Publication Data

US 2019/0089479 A1 Mar. 21, 2019

(30) Foreign Application Priority Data

Sep. 15, 2017 (JP) .................................. 2017-177639

(51) Int. Cl.
*H04B 10/532* (2013.01)
*H04J 14/06* (2006.01)
*H04J 14/02* (2006.01)

(52) U.S. Cl.
CPC ............ *H04J 14/06* (2013.01); *H04B 10/532* (2013.01); *H04J 14/0204* (2013.01)

(58) Field of Classification Search
CPC .............................. H04B 10/532; H04J 14/06
See application file for complete search history.

(56) References Cited

U.S. PATENT DOCUMENTS

| | | | |
|---|---|---|---|
| 2003/0206676 A1* | 11/2003 | Ovadia | G02B 6/12007 385/11 |
| 2012/0134676 A1 | 5/2012 | Kikuchi | |
| 2012/0177383 A1* | 7/2012 | Tanimura | H04B 10/61 398/158 |
| 2013/0315524 A1 | 11/2013 | Saida et al. | |

FOREIGN PATENT DOCUMENTS

EP    2 475 114    7/2012

OTHER PUBLICATIONS

European Search Report in Application No. 18191440.9 dated Mar. 4, 2019 (total pp. 7).

(Continued)

*Primary Examiner* — Nathan M Cors
(74) *Attorney, Agent, or Firm* — Staas & Halsey LLP

(57) ABSTRACT

A transmitter transmitting a polarization multiplexed optical signal, includes: a light source; a generating unit configured to split a light of the light source into first and second polarized lights, optically modulate the first and second polarized lights based on an electric data signal, and multiplex the first polarized light optically-modulated and the second polarized light optically-modulated to generate the polarization multiplexed optical signal; and a coupling unit configured to couple a first reference light having a frequency different from a frequency of the light of the light source with the first polarized light and couple a second reference light having a frequency different from the frequency of the light of the light source with the second polarized light, wherein the first reference light and the second reference light have different frequencies.

6 Claims, 19 Drawing Sheets

(56) References Cited

OTHER PUBLICATIONS

Li et al., "SSBI Mitigation and the Kramers-Kronig Scheme in Single-Sideband Direct-Detection Transmission With Receiver-Based Electronic Dispersion Compensation", Journal of Lightwave Technology, vol. 35, No. 10, May 15, 2017.

Puerta et al., "Optically Generated Single Side-Band Radio-over-Fiber Transmission of 60Gbit/s over 50m a t W-Band", OFC Conference, Mar. 19, 2017, M3E.4.

* cited by examiner

RECEIVER AND RECEIVING METHOD

CROSS-REFERENCE TO RELATED APPLICATION

This application is based upon and claims the benefit of priority of the prior Japanese Patent Application No. 2017-177639 filed on Sep. 15, 2017, the entire contents of which are incorporated herein by reference.

FIELD

A certain aspect of the embodiments described herein relates to a transmitter, a receiver, and a transmit method.

BACKGROUND

As described in, for example, Zhe Li et al.,"SSBI Mitigation and the Kramers-Kronig Scheme in Single-Sideband Direct-Detection Transmission With Receiver-Based Electronic Dispersion Compensation", JLT, vol.35, no. 10, May 15, 2017, there has been known a transmission system in which an IQ-modulated single polarization optical signal is transmitted together with local light and received by a single photodetector. Additionally, there has been known a method that reproduces an I-axis component and a Q-axis component from an optical signal by the heterodyne detection using a costas loop circuit as disclosed in, for example, Rafael Puerta, "Optically Generated Single Side-Band Radio-over-Fiber Transmission of 60 Gbit/s over 50 m at W-Band", OFC Conference, 2017, M3E.4.

In such transmission systems, the adoption of the following transmission process allows the transmission rate to be twice the transmission rate in a case where a single polarized wave is transmitted. First, a polarization multiplexed optical signal in which two polarized components are multiplexed is transmitted. Then, the transmitted polarization multiplexed optical signal is demultiplexed into individual polarized components by a polarization beam splitter at the receive side. Thereafter, the demultiplexed polarized components are received by two photodetectors.

SUMMARY

According to a first aspect of the embodiments, there is provided a transmitter transmitting a polarization multiplexed optical signal, the transmitter including: a light source; a generating unit configured to split a light of the light source into a first polarized light and a second polarized light, optically modulate the first polarized light and the second polarized light based on an electric data signal, and multiplex the first polarized light optically-modulated and the second polarized light optically-modulated to generate the polarization multiplexed optical signal; and a coupling unit configured to couple a first reference light with the first polarized light and couple a second reference light with the second polarized light, the first reference light and the second reference light having frequencies different from a frequency of the light of the light source, wherein the first reference light and the second reference light have different frequencies.

According to a second aspect of the embodiments, there is provided a receiver receiving a polarization multiplexed optical signal in which a first polarized light and a second polarized light are multiplexed, wherein the first polarized light contains a first signal light and a first reference light, a first signal being superimposed on the first signal light, the first signal light having a predetermined frequency, the first reference light having a frequency different from that of the first signal light, the second polarized light contains a second signal light and a second reference light, a second signal being superimposed on the second signal light, the second signal light having the predetermined frequency, the second reference light having a frequency different from those of the second signal light and the first reference light, and the receiver comprises: a polarization demultiplexing unit configured to demultiplex the first polarized light and the second polarized light from the polarization multiplexed optical signal, a first conversion unit configured to convert the first polarized light to a first electric signal; a second conversion unit configured to convert the second polarized light to a second electric signal; a first frequency shift unit configured to generate a first shift signal by shifting a frequency of the first electric signal based on the frequency of the first reference light, and generate a second shift signal by shifting the frequency of the first electric signal based on the frequency of the second reference light; a second frequency shift unit configured to generate a third shift signal by shifting a frequency of the second electric signal based on the frequency of the first reference light, and generate a fourth shift signal by shifting the frequency of the second electric signal based on the frequency of the second reference light; and an extraction unit configured to extract the first signal and the second signal from the first shift signal, the second shift signal, the third shift signal, and the fourth shift signal.

According to a third aspect of the embodiments, there is provided a transmit method for transmitting a polarization multiplexed optical signal, including: splitting a light of a light source to a first polarized light and a second polarized light; generating the polarization multiplexed optical signal by optically modulating each of the first polarized light and the second polarized light based on an electric data signal and multiplexing the first polarized light optically-modulated and the second polarized light optically-modulated; coupling a first reference light with the first polarized light and coupling a second reference light with the second polarized light, the first reference light and the second reference light having frequencies different from a frequency of the light of the light source; and making the frequency of the first reference light and the frequency of the second reference light different from each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When a reference light is coupled with each polarized component of the polarization multiplexed optical signal based on the heterodyne method, the polarization axis of the reference light is typically at an intermediate angle between the polarization axes of individual polarized components. However, when the polarization state of the polarization multiplexed optical signal changes due to the temperature condition or the mechanical condition (such as bend) of the optical fiber, the polarization axis of the reference light may be coincident with the polarization axis of one of the polarized components demultiplexed by the polarization beam splitter. In this case, at the receive side, only the reference light of one of the polarized components is received. Accordingly, the signal is not demodulated normally, and the transmission quality may therefore decrease.

Figure 1:
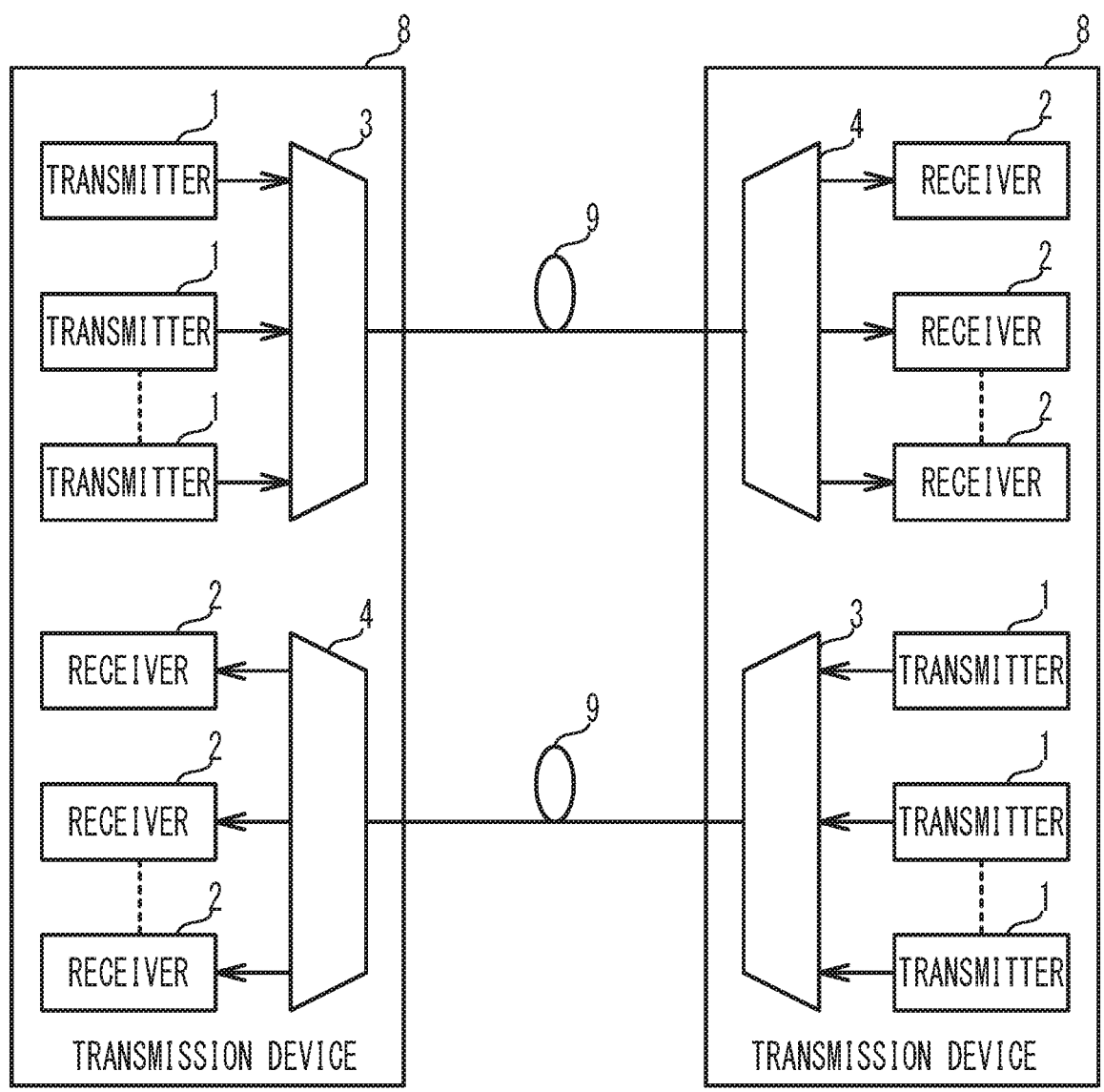
FIG. 1 is a block diagram of an exemplary transmission system.

FIG. 1 is a block diagram of an exemplary transmission system. A transmission system includes, for example, a pair of transmission devices 8 opposed to each other. The transmission device 8 is, for example, a wavelength multiplex transmission device, and includes transmitters 1, receivers 2, a wavelength multiplexing unit 3, and a wavelength demultiplexing unit 4.

The transmitter 1 transmits a polarization multiplexed optical signal. The wavelengths (the frequencies) of the individual polarization multiplexed optical signals transmitted from the transmitters 1 differ from each other. The wavelength multiplexing unit 3 generates a wavelength-multiplexed optical signal by wavelength multiplexing the polarization multiplexed optical signals from the transmitters 1. The wavelength multiplexing unit 3 includes, for example, an optical coupler, a wavelength selective switch (WSS), or the like. The wavelength-multiplexed optical signal is input to the wavelength demultiplexing unit 4 of the other transmission device 8 through an optical fiber 9 that is a transmission line.

The wavelength demultiplexing unit 4 demultiplexes the wavelength-multiplexed optical signal into polarization multiplexed optical signals of respective wavelengths, and outputs the demultiplexed polarization signals of the respective wavelengths to the corresponding receivers 2. The wavelength demultiplexing unit 4 is composed of, for example, an optical splitter, a wavelength selective switch, or the like. The receiver 2 receives a polarization multiplexed optical signal.

Figure 2:
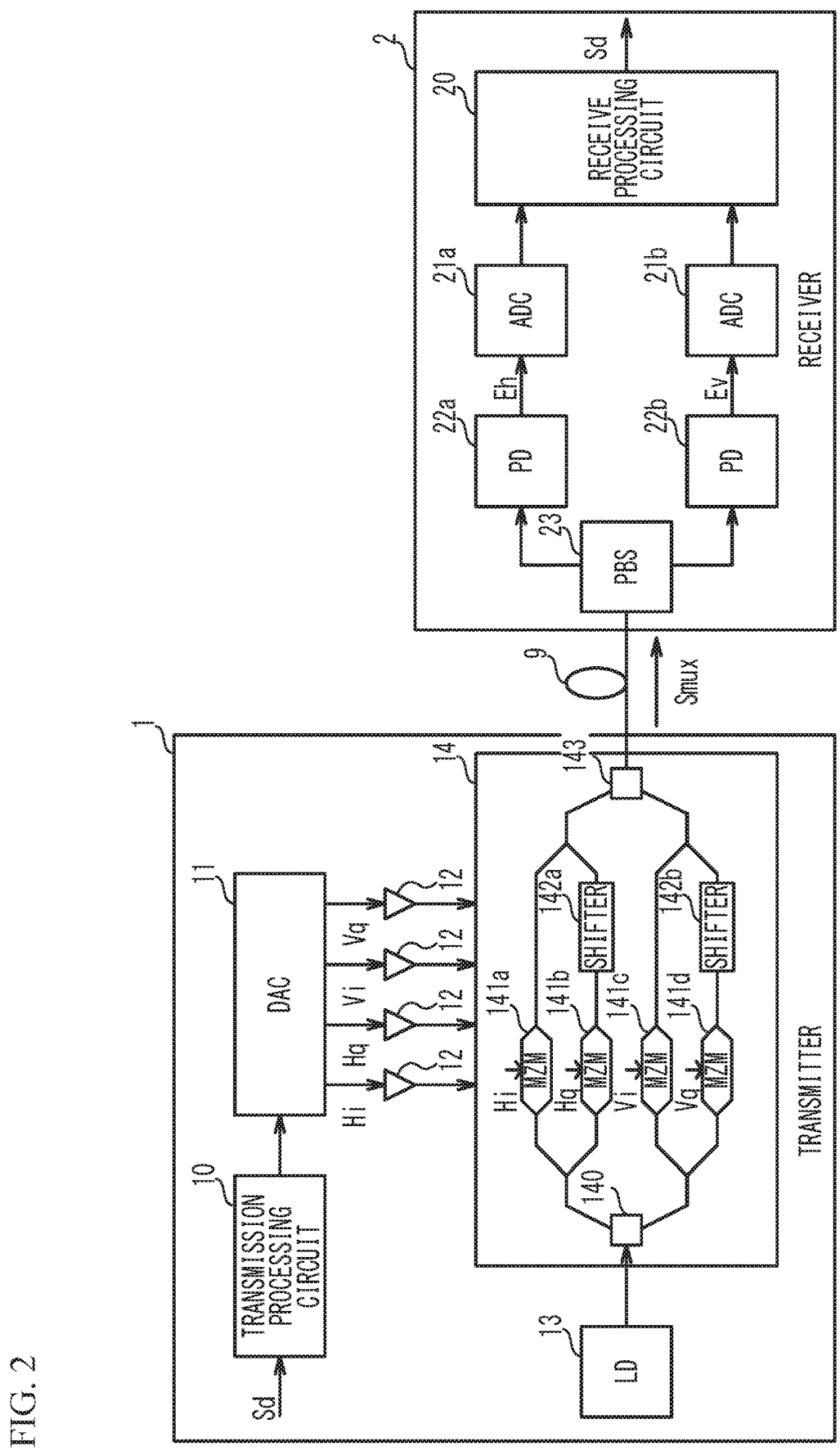
FIG. 2 is a block diagram of an exemplary transmitter and an exemplary receiver.

FIG. 2 is a block diagram illustrating examples of the transmitter 1 and the receiver 2. FIG. 2 illustrates the transmitter 1/receiver 2 pair that transmits and receives a polarization multiplexed optical signal Smux of the same wavelength. In FIG. 2, illustration of the wavelength multiplexing unit 3 and the wavelength demultiplexing unit 4 is omitted.

The transmitter 1 transmits the polarization multiplexed optical signal Smux according to, for example, the heterodyne method, and the receiver 2 receives the polarization multiplexed optical signal Smux according to, for example, the heterodyne method. An H-polarized light and a V-polarized light are multiplexed into the polarization multiplexed optical signal Smux. The H-polarized light is an example of a first polarized light and the V polarized light is an example of a second polarized light.

The transmitter 1 includes a transmission processing circuit 10, a digital-to-analog converter (DAC) 11, amplifiers 12, a laser diode 13, and an optical modulation circuit 14. The transmission processing circuit 10 is composed of, for example, a digital signal processor (DSP), but this does not intend to suggest any limitation. The transmission processing circuit 10 may be composed of, for example, a field programmable gate array (FPGA), an application specified integrated circuit (ASIC), or the like. The DAC 11 is composed of, for example, an ASIC, but this does not intend to suggest any limitation. The DAC 11 may be configured as an internal circuit of the DSP constituting the transmission processing circuit 10.

The transmission processing circuit 10 generates symbol data for optical modulation from a data signal Sd input from a client network (e.g., a local area network (LAN)), and outputs the generated symbol data to the DAC 11. Examples of the data signal Sd include, but are not limited to, an Ethernet signal.

Figure 3:
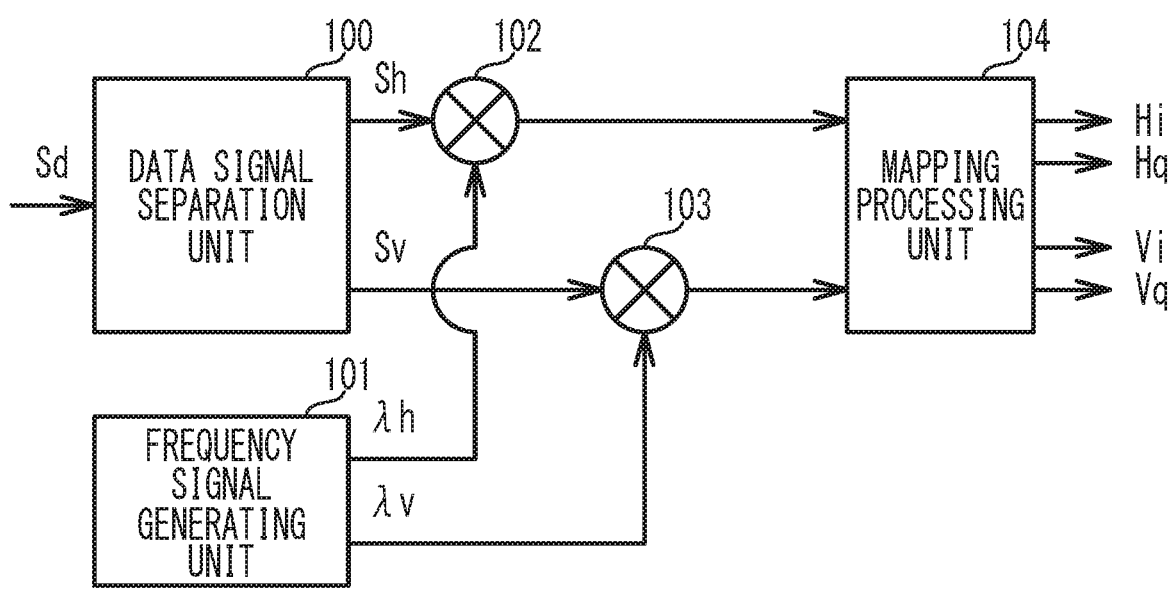
FIG. 3 is a block diagram of an exemplary transmission processing circuit.

FIG. 3 is a block diagram illustrating an example of the transmission processing circuit 10. The transmission processing circuit 10 includes a data signal separation unit 100, a frequency signal generating unit 101, multipliers 102 and 103, and a mapping processing unit 104.

The data signal separation unit 100 is an example of a data separation unit, and separates the data signal Sd into an H-axis signal Sh for optically modulating an H-polarized light and a V-axis signal Sv for optically modulating a V-polarized light. The separation method is not limited, and the data signal separation unit 100 may convert the data signal Sd to parallel data by serial-parallel conversion, and then separate the parallel data into the H-axis signal Sh and the V-axis signal Sv according to bit positions (e.g., high-order bits or low-order bits). The H-axis signal Sh is input to the multiplier 102, and the V-axis signal Sv is input to the multiplier 103.

The frequency signal generating unit 101 generates frequency signals λh and λv with predetermined frequencies. The frequencies of the frequency signals λh and λv are the same in the comparative example, but differ from each other in an embodiment as described later. The frequency signal λh is input to the multiplier 102, and the frequency signal λv is input to the multiplier 103.

The multiplier 102 superimposes the frequency signal λh on the H-axis signal Sh, and the multiplier 103 superimposes the frequency signal λv on the V-axis signal Sv. The H-axis signal Sh and the V-axis signal Sv are input to the mapping processing unit 104.

The mapping processing unit 104 maps the H-axis signal Sh and the V-axis signal Sv into the symbol data according to a predetermined modulation scheme such as quadrature phase shift keying (QPSK). The mapping processing unit 104 generates an electric field signal Hi corresponding to the I component (in-phase component) and an electric field signal Hq corresponding to the Q component (quadrature component) from the symbol data of the H-axis signal Sh, and generates an electric field signal Vi corresponding to the I component and an electric field signal Vq corresponding to the Q component from the symbol data of the V-axis signal Sh.

With reference to FIG. 2 again, the electric field signals Hi, Hq, Vi, and Vq are input to the DAC 11. The DAC 11 converts the electric field signals Hi, Hq, Vi, and Vq from digital signals to analog signals. Each of the electric field signals Hi, Hq, Vi, and Vq is input to the corresponding amplifier 12 and amplified. The amplified electric field signals Hi, Hq, Vi, and Vq are input to the optical modulation circuit 14. The laser diode (LD) 13 is an example of a light source, and emits a light to the optical modulation circuit 14. The center frequency fo of the light of the laser diode 13 differs from the frequencies of the frequency signals λh and λy.

The optical modulation circuit 14 is an example of a generating unit, and splits the light from the laser diode 13 into an H-polarized light and a V-polarized light, optically modulates the H-polarized light and the V-polarized light based on the electric data signal Sd, and multiplexes the optically-modulated lights to generate the polarization multiplexed optical signal Smux. The optical modulation circuit 14 includes a polarization beam splitter (PBS) 140, Mach-Zehnder modulators (MZMs) 141a through 141d, phase shifters 142a and 142b, a polarization beam combiner (PBC) 143.

The PBS 140 splits the light of the laser diode 13 into an H-polarized light and a V-polarized light. The H-polarized light is branched, and the branched lights are input to the MZMs 141a and 141b, while the V-polarized light is branched, and the branched lights are input to the MZMs 141c and 141d.

The MZM 141a optically modulates the H-polarized light based on the electric field signal Hi, while the MZM 141b optically modulates the H-polarized light based on the electric field signal Hq. The phase shifter 142a shifts the phase of the H-polarized light output from the MZM 141b. The H-polarized lights output from the MZMs 141a and 141b are coupled, and the resultant light is input to the PBC 143.

The MZM 141c optically modulates the V-polarized light based on the electric field signal Vi, while the MZM 141d optically modulates the V-polarized light based on the electric field signal Vq. The phase shifter 142b shifts the phase of the V-polarized light output from the MZM 141d. The shift amounts of the phase shifters 142a and 142b are determined based on, for example, the modulation scheme of the data signal Sd. The V-polarized lights output from the MZMs 141c and 141d are coupled, and the resultant light is input to the PBC 143.

The PBC 143 couples the H-polarized light from the MZMs 141a and 141b with the V-polarized light from the MZMs 141c and 141d to generate the polarization multiplexed optical signal Smux, and outputs the polarization multiplexed optical signal Smux to the optical fiber 9. The polarization multiplexed optical signal Smux is transmitted in the above-described manner.

The receiver 2 receives the polarization multiplexed optical signal Smux. The receiver 2 includes a reception processing circuit 20, analog-to-digital converters (ADCs) 21a and 21b, photodetectors (PDs) 22a and 22b, and a PBS 23.

The PBS 23 is supplied with the polarization multiplexed optical signal Smux from the optical fiber 9. The PBS 23 is an example of a polarization demultiplexing unit, and demultiplexes the H-polarized light and the V-polarized light from the polarization multiplexed optical signal Smux. The H-polarized light is input to the PD 22a, and the V-polarized light is input to the PD 22b.

The PD 22a is an example of a first conversion unit, and converts the H-polarized light to an electric H-polarized signal Eh. The H-polarized signal Eh is an example of a first electric signal. The ADC 21a converts the H-polarized signal Eh from an analog signal to a digital signal, and outputs the converted signal to the reception processing circuit 20.

The PD 22b is an example of a second conversion unit, and converts the V-polarized light to an electric V-polarized signal Ev. The V-polarized signal Ev is an example of a second electric signal. The ADC 21b converts the V-polarized signal Ev from an analog signal to a digital signal, and outputs the converted signal to the reception processing circuit 20. The reception processing circuit 20 is composed of, for example, a DSP, but this does not intend to suggest any limitation. The reception processing circuit 20 may be composed of, for example, an FPGA or an ASIC. The ADCs 21a and 21b are composed of, for example, an ASIC, but this does not intend to suggest any limitation. The ADCs 21a and 21b may be configured as an internal circuit of the DPS constituting the reception processing circuit 20.

Figure 4:
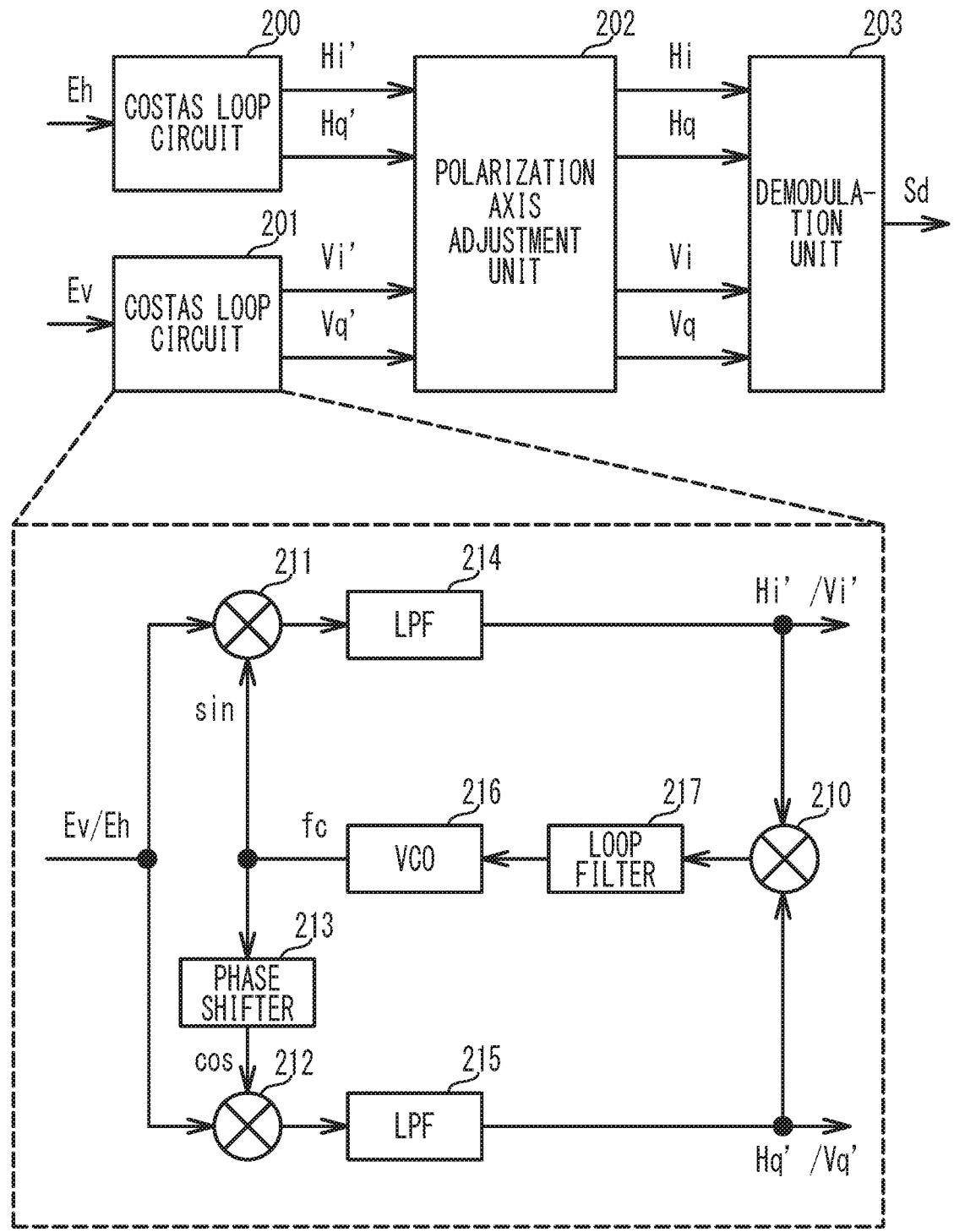
FIG. 4 is a block diagram of a reception processing circuit in a comparative example.

FIG. 4 is a block diagram of the reception processing circuit 20 in the comparative example. The reception processing circuit 20 includes costas loop circuits 200 and 201, a polarization axis adjustment unit 202, and a demodulation unit 203. The costas loop circuit 200 is supplied with the H-polarized signal Eh, while the costas loop circuit 201 is supplied with the V-polarized signal Ev. FIG. 4 illustrates the structure of the costas loop circuit 201, which is one of the costas loop circuits, but the costas loop circuit 200 has the same structure as the costas loop circuit 201.

The costas loop circuit 200 includes multipliers 210 through 212, a phase shifter 213, low pass filters (LPFs) 214 and 215, a voltage-controlled oscillator (VCO) 216, and a loop filter 217. The costas loop circuit 200 detects the H-polarized signal Eh by the heterodyne method, and decodes the I component and the Q component of the H-polarized signal Eh. The costas loop circuit 201 detects the V-polarized signal Ev by the heterodyne method, and decodes the I component and the Q component of the V-polarized signal Ev.

The H-polarized signal Eh (or the V-polarized signal Ev) is branched, and the resultant signals are input to the multipliers 211 and 212. The VCO 216 outputs a sin signal with a predetermined frequency fc, and the sin signal is branched, and the branched sin signals are input to the multiplier 211 and the phase shifter 213. The sin signal input to the phase shifter 213 is converted into a cos signal by shifting the phase of the sin signal by 90 degrees. The cos signal is input to the multiplier 212.

The multiplier 211 superimposes the H-polarized signal Eh on the sin signal, and outputs the resultant signal to the LPF 214. The LPF 214 removes the spectral component of the sum of the H-polarized signal Eh and the sin signal from the signal input from the multiplier 211, and outputs the spectral component of the difference as an electric field signal Hi' (or an electric field signal Vi') to the polarization axis adjustment unit 202. The electric field signal Hi' (or the electric field signal Vi') is input to the multiplier 210.

The multiplier 212 superimposes the H-polarized signal Eh on the cos signal, and outputs the resultant signal to the LPF 215. The LPF 215 removes the spectral component of the sum of the H-polarized signal Eh and the cos signal from the signal input from the multiplier 212, and outputs the spectral component of the difference as an electric field signal Hq' (or an electric field signal Vq') to the polarization axis adjustment unit 202. The electric field signal Hq' (or the electric field signal Vq') is input to the multiplier 210.

The multiplier 210 superimposes the electric field signal Hi' (or the electric field signal Vi') on the electric field signal Hq' (or the electric field signal Vq'), and outputs the resultant signal to the loop filter 217. The loop filter 217 filters the superimposed signal of the electric field signal Hi' and the electric field signal Hq', and outputs the filtered signal as a voltage control signal to the VCO 216.

The above-described configuration makes the costas loop circuits 200 and 201 function as phase locked loops (PLLs) and synchronize the frequencies fc of the VCOs 216 with the frequencies of the H-polarized signal Eh and the V-polarized signal Ev. The present example uses a digitally controlled oscillator (DCO) as the VCO 216, but does not intend to suggest any limitation.

The polarization axis adjustment unit 202 adjusts the difference between the H-axes of the transmitter 1 and the receiver 2 and the difference between the V-axes of the transmitter 1 and the receiver 2 by means of adaptive equalization. Accordingly, the polarization axis adjustment unit 202 reproduces the electric field signals Hi, Hq, Vi, and Vq generated by the transmitter 1. The electric field signals Hi, Hq, Vi, and Vq are input to the demodulation unit 203.

The demodulation unit 203 reproduces the data signal Sd by demodulating the electric field signals Hi, Hq, Vi, and Vq. At the same time, the demodulation unit 203 also decodes a forward error correction (FEC) code. The reception processing circuit 20 may have a function to compensate dispersion generated in the optical fiber 9, and a function to compensate beat noise between signals in addition to the above-described functions.

Next, the polarization multiplexed optical signal Smux in the comparative example will be described.

Figure 5:
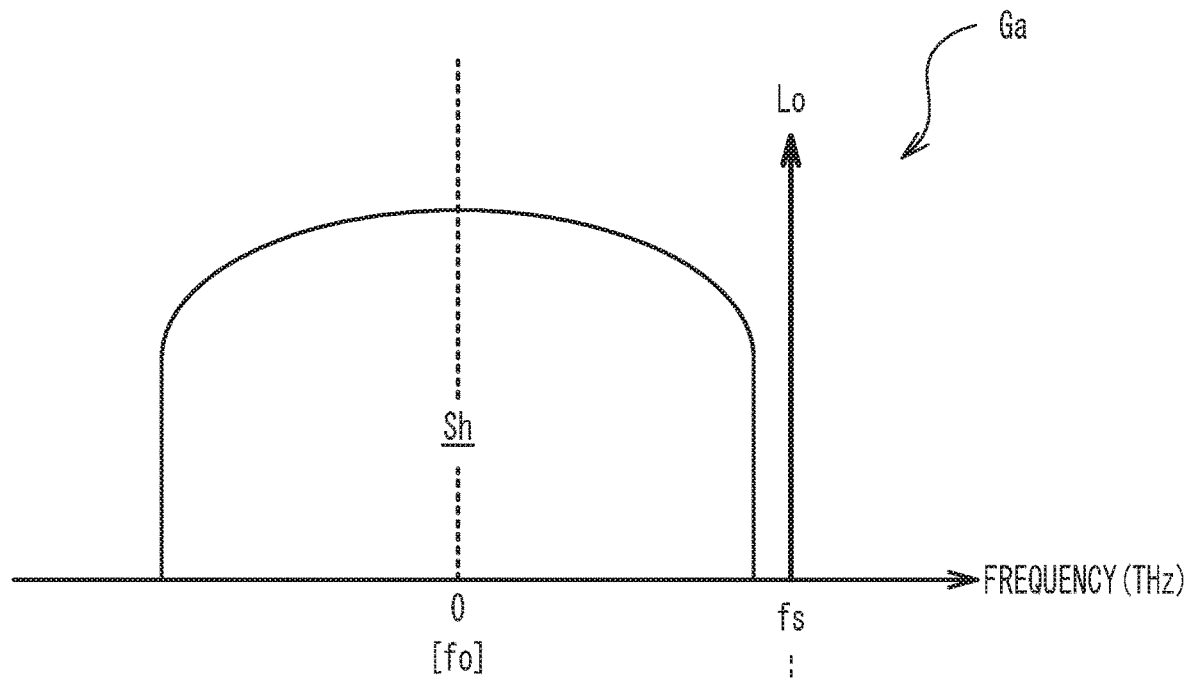
FIG. 5 illustrates the spectra of an H-polarized light and a V-polarized light in the comparative example.
Figure 5:
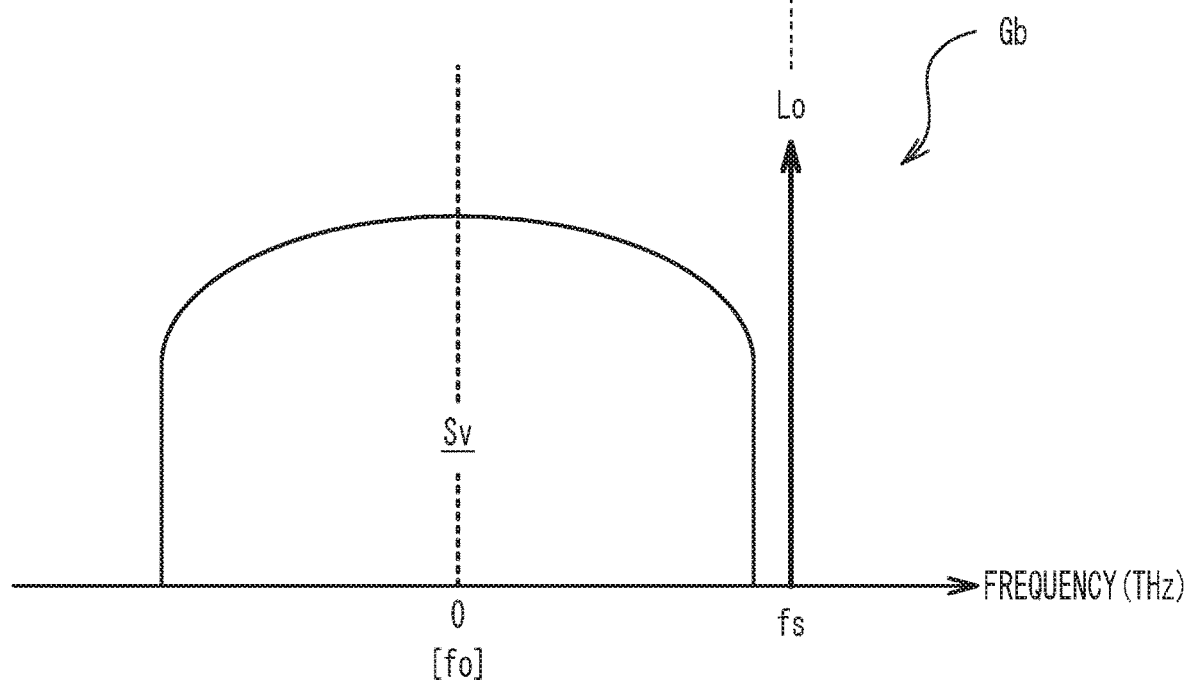

FIG. 5 is a diagram illustrating the spectra of an H-polarized light and a V-polarized light in the comparative example. The reference Ga indicates the spectrum of the H-polarized light, and the reference Gb indicates the spectrum of the V-polarized light. In the graphs of the references Ga and Gb, the horizontal axis represents the deviation from the center frequency fo of the laser diode as a frequency. Thus, the center frequencies of the spectral components of the H-axis signal Sh and the V-axis signal Sv are 0. The same applies to the description hereinafter.

In the comparative example, the frequency signal generating unit 101 generates the frequency signals λh and λv having identical frequencies. The frequency signal λh is superimposed on the H-axis signal Sh, while the frequency signal λv is superimposed on the V-axis signal Sv. The center frequency fo of the light of the laser diode 13 differs from the frequencies of the frequency signals λh and λv. Accordingly, the reference light Lo having a frequency fs different from the center frequency fo is coupled with the H-polarized light and the V-polarized light.

Figure 6:
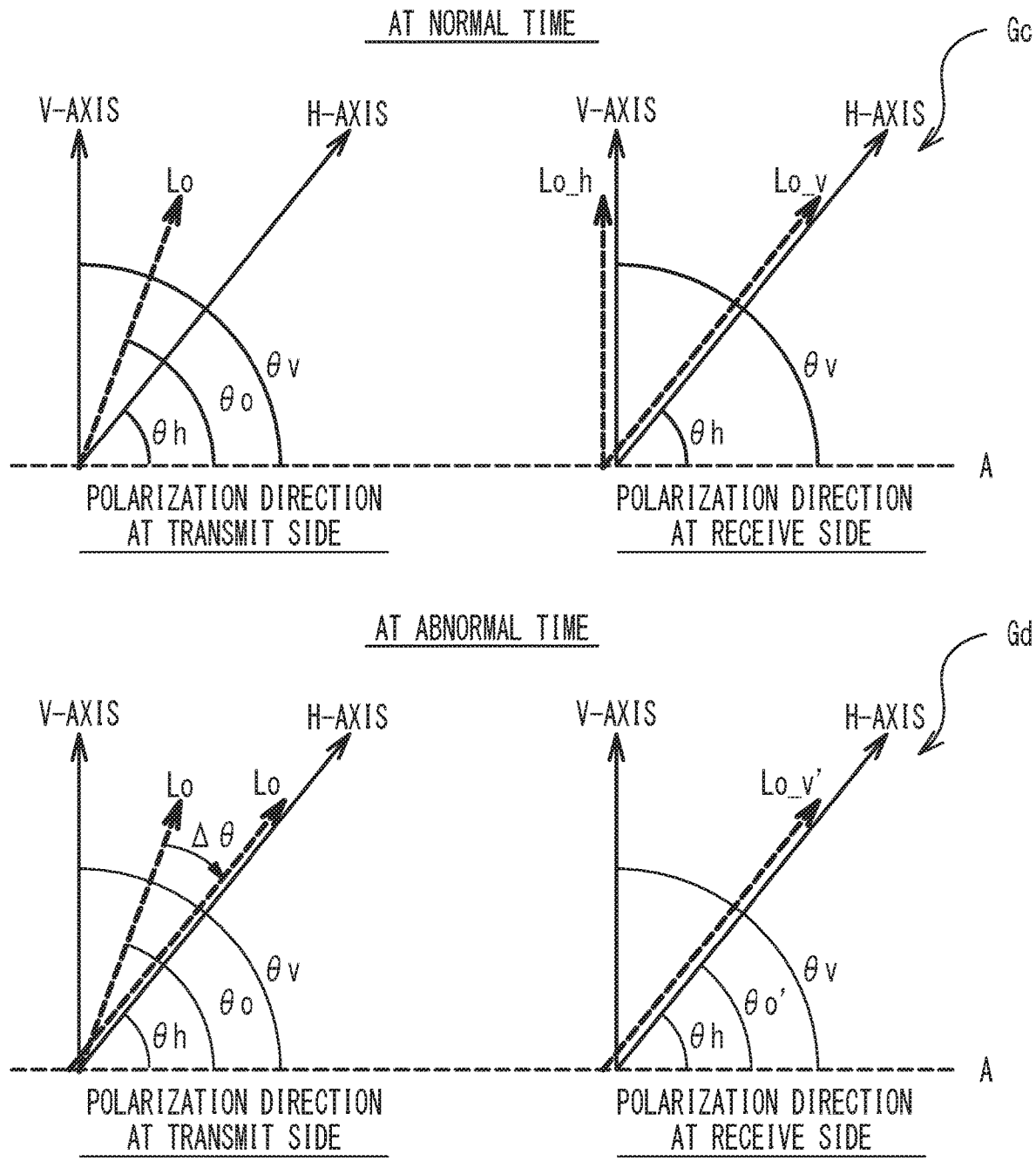
FIG. 6 illustrates examples of polarization directions of reference lights at a transmit side and a receive side at a normal time and an abnormal time.

FIG. 6 is a diagram illustrating the polarization direction of the reference light Lo at the transmit side and the receive side at a normal time and an abnormal time. The reference Gc presents the polarization directions of the reference lights Lo at the transmit side and the receive side at a normal time, and the reference Gd presents the polarization directions of the reference lights Lo at the transmit side and the receive side at an abnormal time. In the present example, the H-axis (the polarization direction of the H-polarized light) and the V-axis (the polarization direction of the V-polarized light) are respectively coincident with the H-axis and the V-axis at the transmit side. However, the H-axis and the V-axis may not be necessarily respectively coincident with the H-axis and the V-axis at the receive side.

At a normal time, the reference light Lo emitted from the transmitter 1 is combined with an H-polarized component and a V-polarized component, and thereby the polarization direction of the reference light Lo becomes at an intermediate angle between the V-axis and the H-axis. That is, the relationship of θh<θo<θv holds among the angle θh of the H-axis with respect to the reference axis A, the angle θv of the V-axis with respect to the reference axis A, and the angle θo of the polarization direction of the reference light Lo with respect to the reference axis A.

At a normal time, in the receiver 2, the reference light Lo is separated by the PBS 23 into a component Lo_h in the direction of the H-axis and a component Lo_v in the direction of the V-axis. Thus, the reference light Lo is included in both the H-polarized light and the V-polarized light. Accordingly, the receiver 2 can decode the H-axis signal Sh, which is the H-polarized component of the data signal Sd, from the H-polarized light, and can decode the V-axis signal Sv, which is the V-polarized component of the data signal Sd, from the V-polarized light. Therefore, the receiver 2 is able to normally demodulate the data signal Sd.

At an abnormal time, during transmission, the polarization direction of the reference light Lo at the transmit side may change by, for example, Δθ and may be coincident with the H-axis because of change in the polarization state of the polarization multiplexed optical signal Smux due to the temperature conditions or mechanical conditions (e.g., bend) of the optical fiber. That is, the relationship of θh≈θo' holds between the angle θh of the H-axis after the change with respect to the reference axis A and the angle θo'(=θo−Δθ) of the polarization direction of the reference light Lo after the change with respect to the reference axis A. In this case, the reference light Lo at the receive side has only the component Lo_v' in the H-axis direction, and does not have the component in the V-axis direction.

Thus, the receiver 2 can decode the H-axis signal Sh from the H-polarized light, but cannot decode the V-axis signal Sv from the V-polarized light. Accordingly, the receiver 2 is unable to normally demodulate the data signal Sd. When the polarization direction of the reference light Lo is substantially coincident with the V-axis, it is also impossible to demodulate the data signal Sd as in the above-described case.

Hence, the embodiment makes the frequency of the reference light Lo to be coupled with the H-polarized light differ from the frequency of the reference light Lo to be coupled with the V-polarized light. The following will describe the polarization multiplexed optical signal Smux in the embodiment.

Figure 7:
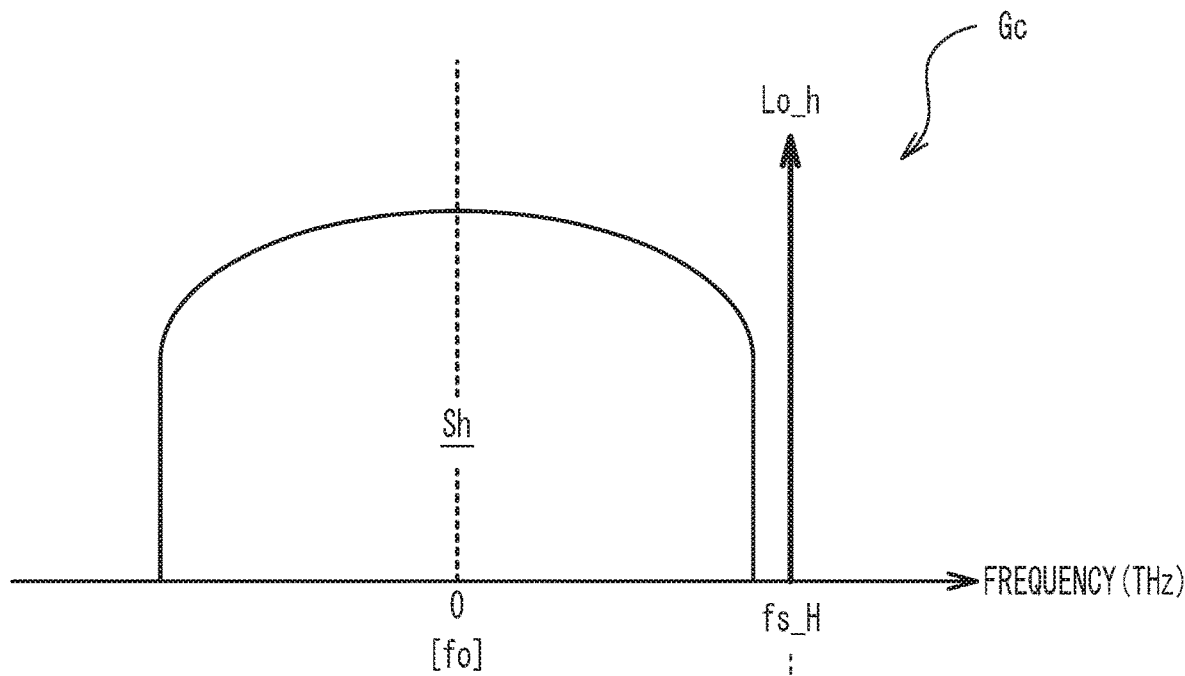
FIG. 7 illustrates the spectra of an H-polarized light and a V-polarized light in an embodiment.
Figure 7:
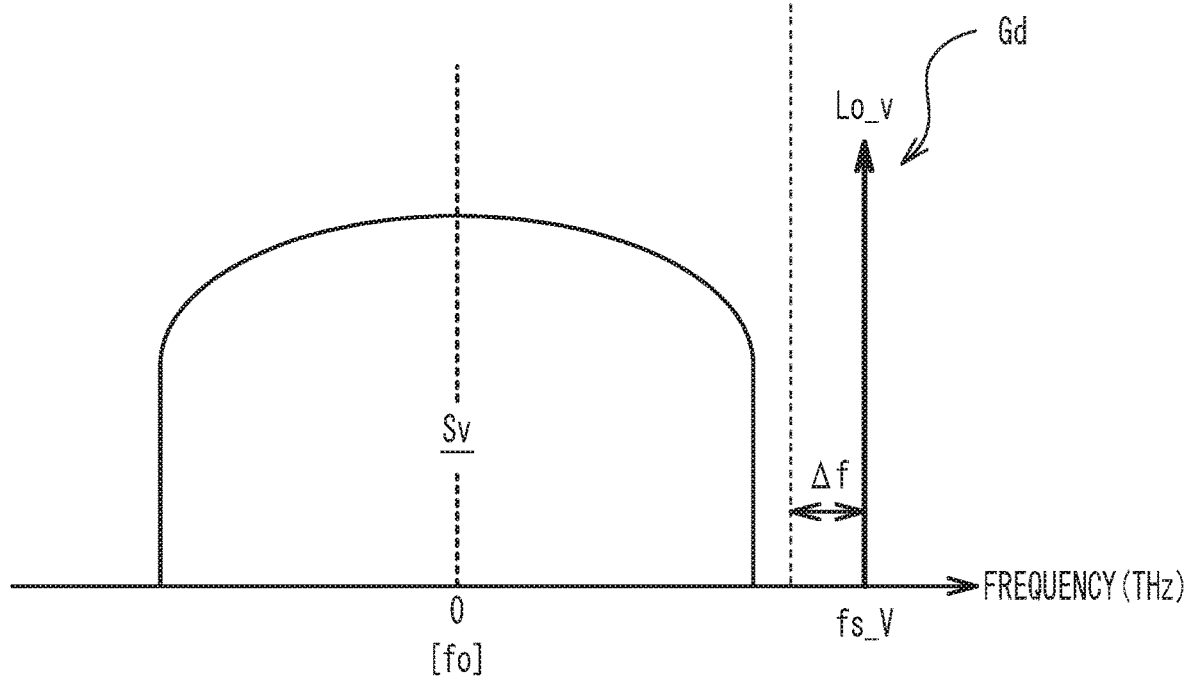

FIG. 7 illustrates the spectra of an H-polarized light and a V-polarized light in the embodiment. In FIG. 7, the same references are affixed to the components common to those in FIG. 5, and the description thereof is omitted. The reference Gc indicates the spectrum of the H-polarized light, and the reference Gd indicates the spectrum of the V-polarized light.

In the embodiment, the frequency signal generating unit 101 generates the frequency signals λh and λv having different frequencies. The frequency signal λh is superimposed on the H-axis signal Sh, and the frequency signal λv is superimposed on the V-axis signal Sv. The center frequency fo of the light of the laser diode 13 differs from the frequencies of the frequency signals λh and λv. Thus, the H-polarized light is coupled with the reference light Lo_h having the frequency fs_H different from the center frequency fo, and the V-polarized light is coupled with the reference light Lo_v having the frequency fs_V different from the center frequency fo and the frequency fs_H. The difference Δf between the frequency fs_H and the frequency fs_V is not limited as long as the advantage described hereinafter is achieved.

Figure 8:
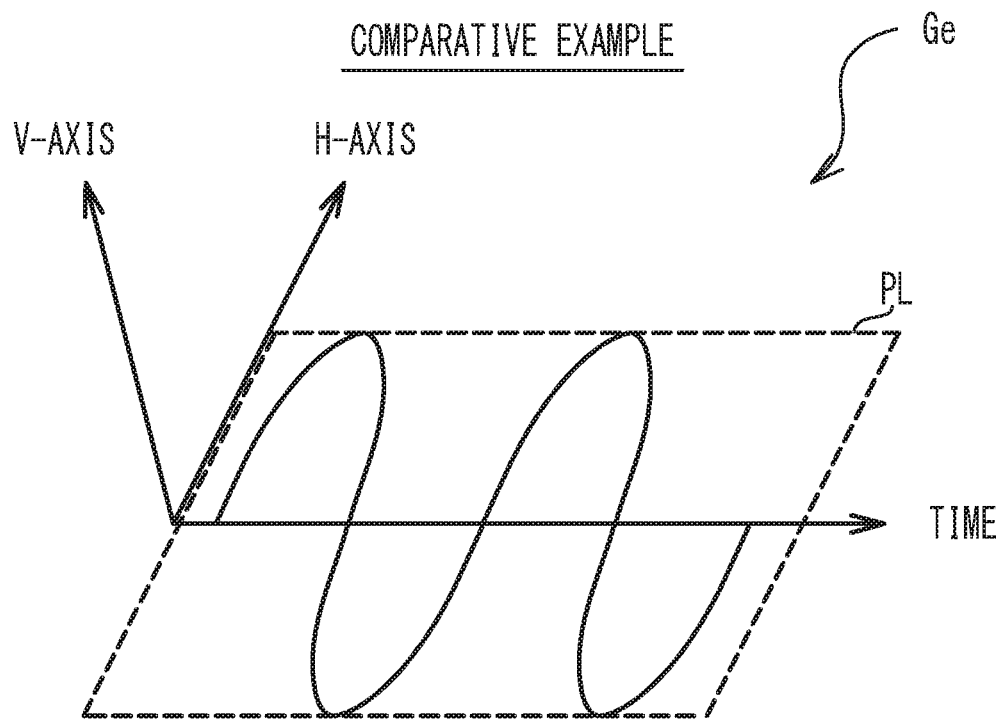
FIG. 8 illustrates polarization states of reference lights in the comparative example and the embodiment.
Figure 8:
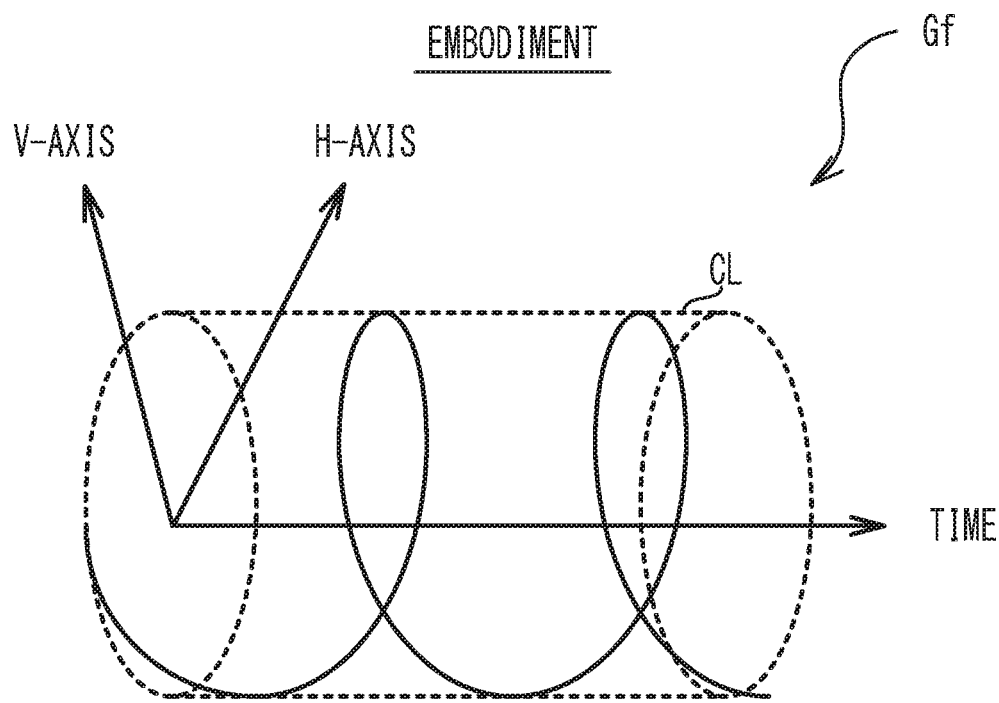

FIG. 8 illustrates the polarization states of the reference lights Lo, Lo_h, and Lo_v in the comparative example and the embodiment. The reference Ge indicates change in the polarization state of the reference light Lo with respect to time in the comparative example, and the reference Gf indicates change in the polarization states of the reference lights Lo_h and Lo_v in the embodiment.

In the comparative example, the frequency fs of the reference light Lo is the same between the H-polarized wave and the V-polarized wave. Thus, the reference light Lo becomes a linearly polarized light, and oscillates in a specific plane PL. Accordingly, at the above-described abnormal time, the plane PL and the H-axis becomes parallel, and thereby the V-polarized component of the reference light Lo is dispersed.

On the other hand, in the embodiment, the frequency fs_H of the H-polarized reference light Lo_h differs from the frequency fs_V of the V-polarized reference light Lo_v. Thus, the polarized waves of the reference lights Lo_h and Lo_v are combined. Thus, the combined light of the reference lights Lo_h and Lo_v does not become a linearly polarized light unlike the comparative example, and its polarization direction changes with time.

For example, the polarization direction of the combined light of the reference lights Lo_h and Lo_v forms a spiral trajectory at a speed according to the difference between the frequencies fs_H and fs_V (see the reference CL). Therefore, the polarization directions of the reference lights Lo_h and Lo_v are never coincident with one of the H-axis or the V-axis even at the above-described abnormal time. Thus, the receiver 2 is able to demodulate the data signal Sd normally.

As described above, the frequency signal generating unit 101 couples the reference light Lo_h having the frequency fs_H different from the frequency of the light of the laser diode 13 with the H-polarized light by the multiplier 102, and couples the reference light Lo_v having the frequency fs_V different from the frequency of the light of the laser diode 13 with the V-polarized light by the multiplier 103, wherein the reference lights Lo_h and Lo_v have different frequencies. Thus, deterioration in transmission quality due to change in the polarization state of the polarization multiplexed optical signal Smux is reduced. The frequency signal generating unit 101 and the multipliers 102 and 103 are examples of a coupling unit, and the reference lights Lo_h and Lo_v are examples of a first reference light and a second reference light, respectively.

More specifically, the frequency signal generating unit 101 couples the reference light Lo_h with the H-polarized light by superimposing the electric frequency signal λh on the H-axis signal Sh, and couples the reference light Lo_v with the V-polarized light by superimposing the electric frequency signal λv on the V-axis signal Sv, the electric frequency signal λh and λv having different frequencies. Thus, the frequency signal generating unit 101 can electrically couple the reference lights Lo_h and Lo_v, and therefore, it is unnecessary to use costly parts for the optical system, and the cost of the transmitter 1 is thereby reduced.

In addition, the process for coupling the reference lights Lo_h and Lo_v is not limited to the electric process described above, and may be an optical process.

Figure 9:
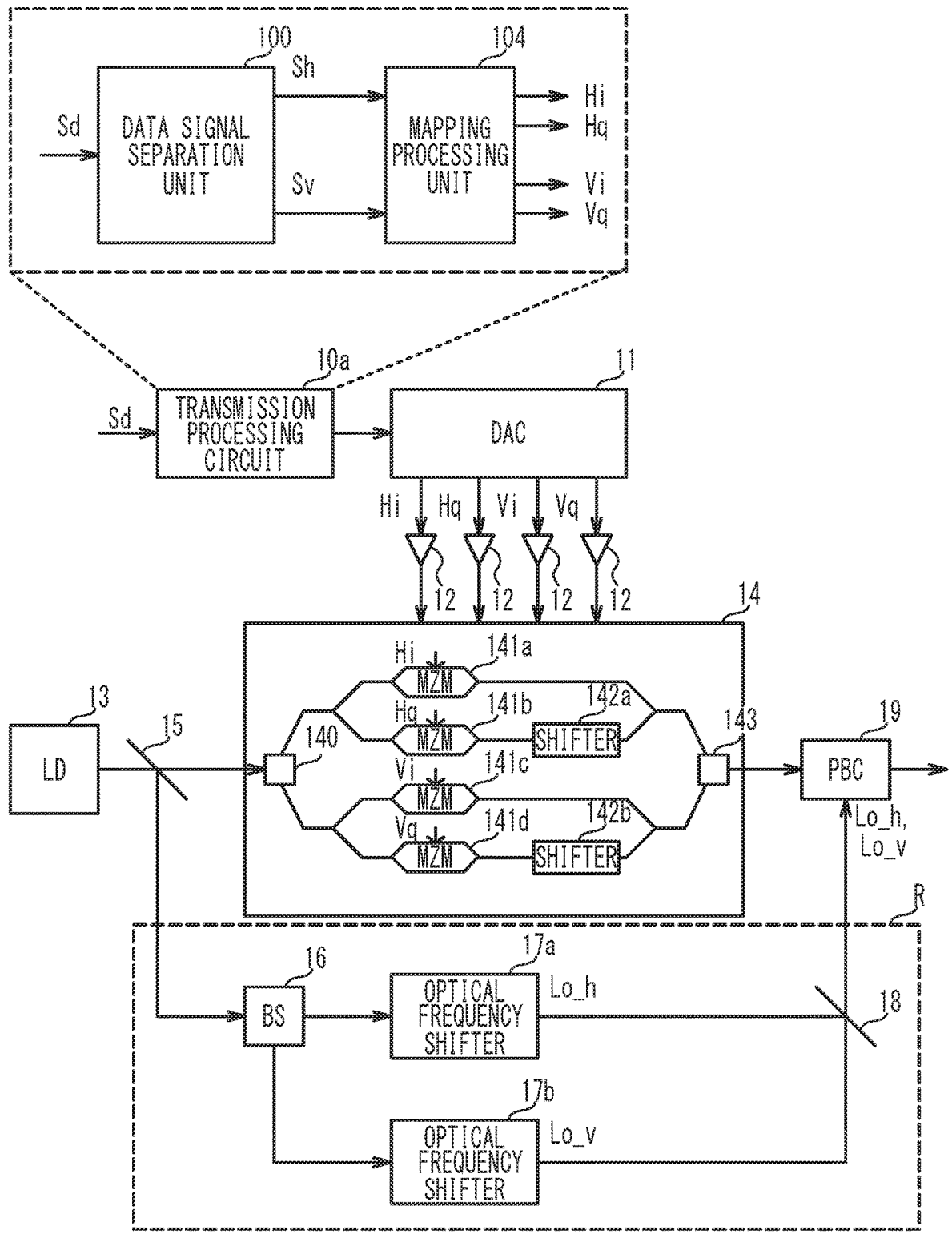
FIG. 9 is a block diagram of another exemplary transmitter.

FIG. 9 is a block diagram illustrating another example of the transmitter 1. In FIG. 9, the same references are affixed to the components common to those of FIG. 2 and FIG. 3, and the description thereof is omitted.

The transmitter 1 includes a transmission processing circuit 10a, the digital-to-analog converter 11, the amplifiers 12, the laser diode 13, the optical modulation circuit 14, an optical splitter 15, a PBC 19, and a reference light generating unit R. The transmission processing circuit 10a is composed of, for example, a DSP, but this does not intend to suggest any limitation. The transmission processing circuit 10a may be composed of, for example, an FPGA or an ASIC.

In the present example, the reference lights Lo_h and Lo_v are optically generated by the reference light generating unit R. Thus, unlike the above-described embodiment, the transmission processing circuit 10a has none of the frequency signal generating unit 101 and the multipliers 102 and 103. Thus, the electric field signals Hi, Hq, Vi, and Vq do not contain the frequency signal λh or λv.

The light of the laser diode 13 is split by the optical splitter 15, and split lights are then input to the optical modulation circuit 14 and the reference light generating unit R. The reference light generating unit R includes a beam splitter (BS) 16, optical frequency shifters 17a and 17b, and an optical coupler 18.

The BS 16 splits the light input from the optical splitter 15 and introduces the split lights to the optical frequency shifters 17a and 17b. The optical frequency shifters 17a and 17b respectively generate the reference lights Lo_h and Lo_v by shifting the center frequencies of the lights input from the BS 16. The shift amounts of the frequencies by the optical frequency shifters 17a and 17b differ from each other. The optical coupler 18 couples the reference lights Lo_h and Lo_v and introduces the resultant light to the PBC 19. The PBC 19 couples the reference light Lo_h with the H-polarized light output from the optical modulation circuit 14, and couples the reference light Lo_v with the V-polarized light output from the optical modulation circuit 14.

As described above, the reference light generating unit R couples the reference light Lo_h having a frequency different from that of the light of the laser diode 13 with the H-polarized light by the PBC 19, and couples the reference light Lo_v having a frequency different from that of the light of the laser diode 13 with the V-polarized light by the PBC 19. The reference lights Lo_h and Lo_v have different frequencies. Thus, the same advantage as the above-described embodiment is achieved. The reference light generating unit R and the PBC 19 are examples of the coupling unit.

More specifically, the reference light generating unit R generates the reference lights Lo_h and Lo_v by splitting the light of the laser diode 13 and shifting the center frequency of each of the split lights, and the PBC 19 couples the reference light Lo_h with the H-polarized light and couples the reference light Lo_v with the V-polarized light.

This configuration allows the reference light generating unit R to control the frequencies of the reference lights Lo_h and Lo_v precisely. In addition, since the reference light generating unit R generates the reference lights Lo_h and Lo_v by using the light of the laser diode 13, the cost is reduced compared to a case where a light source is provided separately from the laser diode 13.

The receiver 2 of the embodiment will be described. As described above, the H-polarized light and the V-polarized light are multiplexed in the polarization multiplexed optical signal Smux. The H-polarized light contains an H-axis signal light (see Sh in FIG. 7) and the reference light Lo_h. The H-axis signal light has the frequency fo, and the H-axis signal Sh is superimposed on the H-axis signal light. The reference light Lo_h has a frequency different from that of the H-axis signal light. The V-polarized light contains a V-axis signal light (see Sv in FIG. 7) and the reference light Lo_v. The V-axis signal light has the frequency fo, and the V-axis signal Sv is superimposed on the V-axis signal light. The reference light Lo_v has a frequency different from those of the V-axis signal light and the reference light Lo_h. The H-axis signal light is an example of a first signal light, and the V-axis signal light is an example of a second signal light.

Therefore, each of the H-polarized signal Eh output from the PD 22a and the V-polarized signal Ev output from the PD 22b contains four beat signals (difference frequency signals) B1 through B4. The beat signal B1 is a signal detected by the costas loop circuit 200 of the receiver 2 of the comparative example, and is a beat signal generated from the reference light Lo_h and the H-axis signal light. The beat signal B2 is a signal detected by the costas loop circuit 201 of the receiver 2 of the comparative example, and is a beat signal generated from the reference light Lo_v and the V-axis signal light.

The beat signals B3 and B4 are signals unnecessary to be received. The beat signal B3 is a beat signal generated from the reference light Lo_v and the H-axis signal light, and the beat signal B4 is a beat signal generated from the reference light Lo_h and the V-axis signal light. The center frequency of the beat signal B3 is higher than the center frequency of the beat signal B1 by (fs_V−fs_H), and the center frequency of the beat signal B4 is higher than the center frequency of the beat signal B2 by (fs_V−fs_H).

To remove the beat signals B3 and B4 by filtering, the receiver 2 shifts the frequencies of the H-polarized signal Eh and the V-polarized signal Ev based on the frequencies fs_H and fs_V of the reference lights Lo_h and Lo_v. Hereinafter, an exemplary configuration of the reception processing circuit 20 is described.

Figure 10:
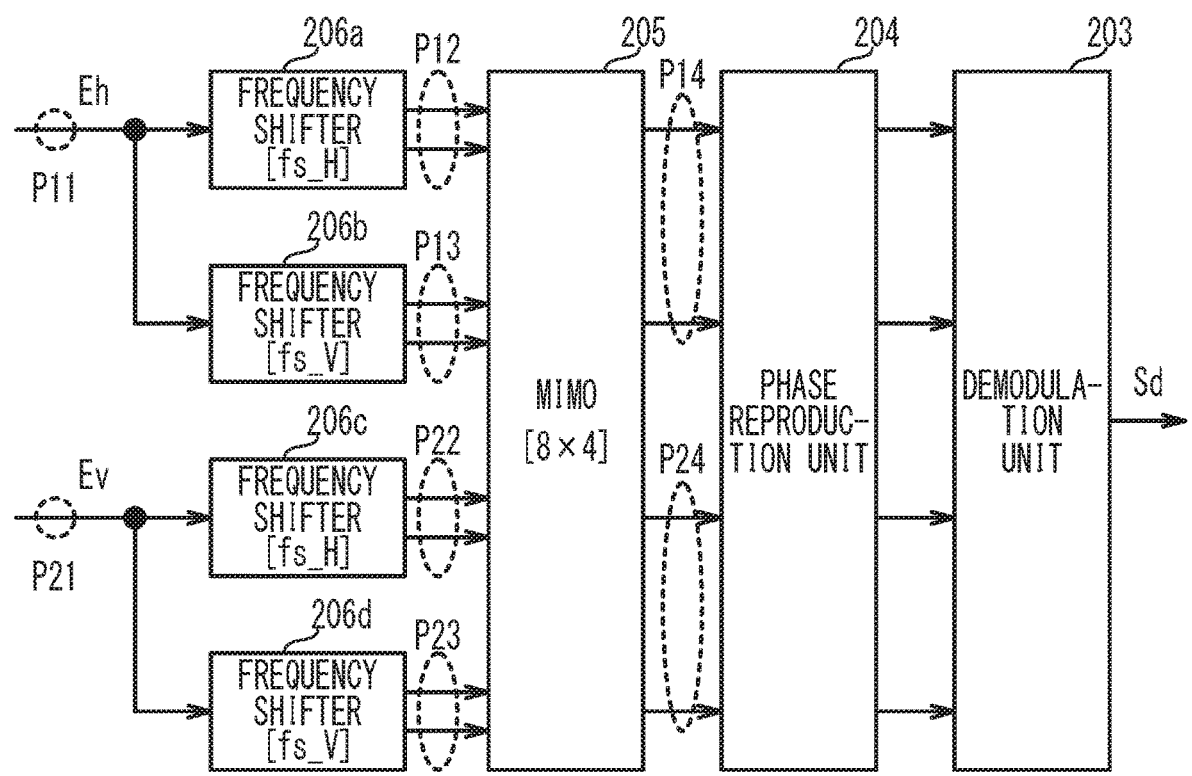
FIG. 10 is a block diagram of an exemplary reception processing circuit.

FIG. 10 is a block diagram illustrating an example of the reception processing circuit 20. The reception processing circuit 20 includes frequency shifters 206a through 206d, an MIMO 205, a phase reproduction unit 204, and the demodulation unit 203. The demodulation unit 203 has the same configuration as that of the comparative example, and the description thereof is thus omitted.

In FIG. 11 through FIG. 14, presented are the electric spectra of the H-polarized signal Eh and the V-polarized signal Ev at the points indicated by references P11 through P14 and P21 through P24.

The H-polarized signal Eh is split, and the split H-polarized signals Eh are input from the PD 22a to the frequency shifters 206a and 206b. The V-polarized signal Ev is split, and the split V-polarized signals Ev are input from the PD 22b to the frequency shifters 206c and 206d.

Figure 11:
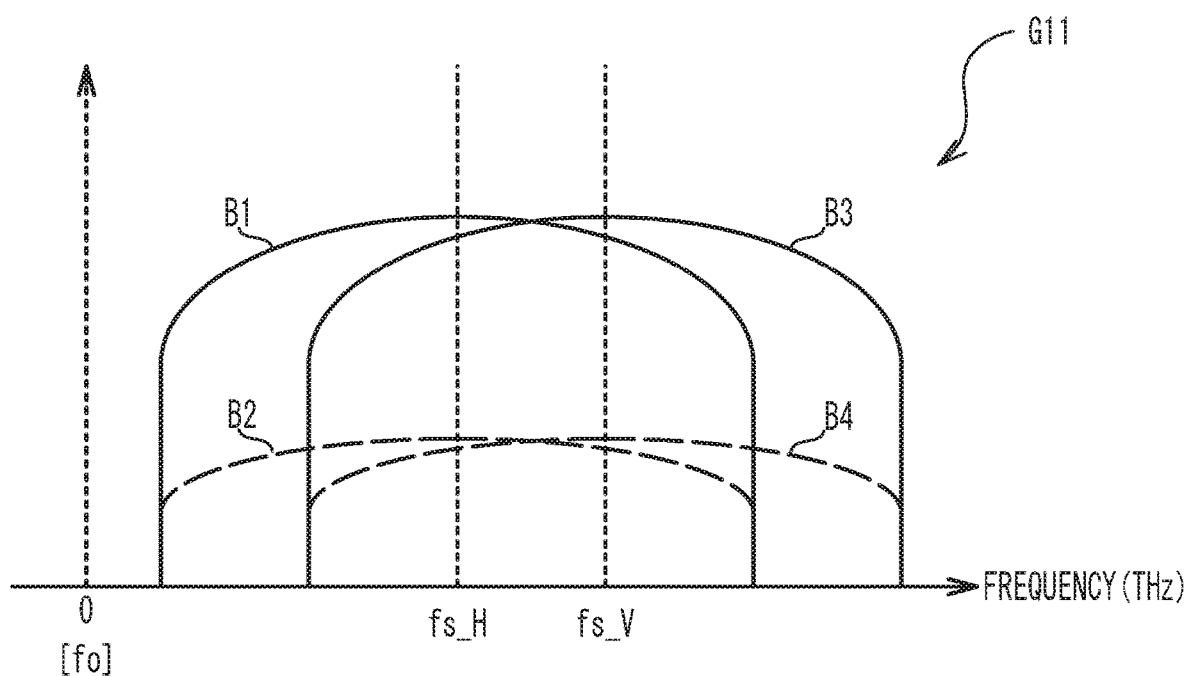
FIG. 11 illustrates examples of the electric spectra of an H-polarized signal and a V-polarized signal.
Figure 11:
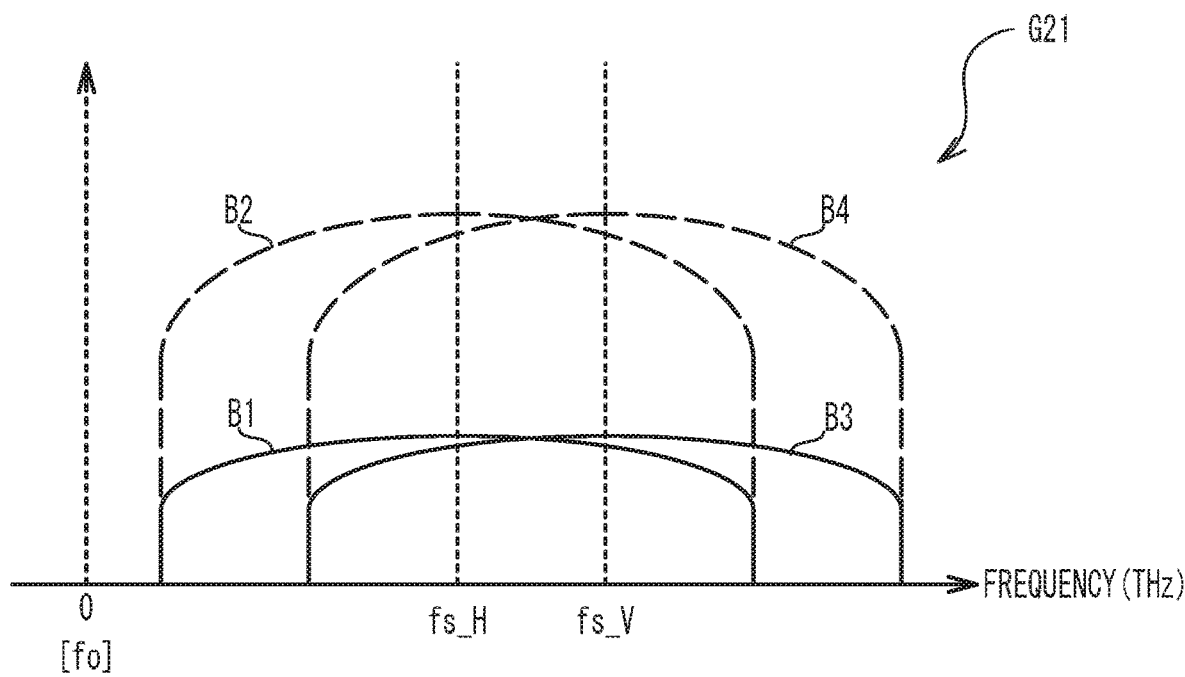

In FIG. 11, the reference G11 indicates the electric spectra of the H-polarized signals Eh (see the reference P11) input to the frequency shifters 206a and 206b, and the reference G21 indicates the electric spectra of the V-polarized signals Ev (see the reference P21) input to the frequency shifters 206c and 206d. In FIG. 11 through FIG. 14, the spectra of the beat signals B1 and B3 are indicated by solid lines, and the spectra of the beat signals B2 and B4 are indicated by dotted lines.

The H-polarized signal Eh contains the H-polarized components more than the V-polarized components. Thus, the power of each of the beat signals B1 and B3 is greater than the power of each of the beat signals B2 and B4. The center frequency of each of the beat signals B1 and B2 is fs_H, and the center frequency of each of the beat signals B3 and B4 is fs_V.

The V-polarized signal Ev contains the V-polarized components than the H-polarized components. Thus, the power of each of the beat signals B2 and B4 is greater than the power of each of the beat signals B1 and B3. The center frequency of each of the beat signals B1 and B2 is fs_H, and the center frequency of each of the beat signals B3 and B4 is fs_V.

The reception processing circuit 20 cannot remove the beat signal B3 or B4 in the above-described state. Thus, two signals from which the spectra of the beat signals B3 and B4 can be extracted are generated by shifting the frequencies of the H-polarized signal Eh and the V-polarized signal Ev with the frequency shifters 206a through 206d. In the following description, the signals generated by shifting the frequencies of the H-polarized signal Eh and the V-polarized signal Ev are referred to as shift signals.

The frequency shifter 206a shifts the frequency of the H-polarized signal Eh based on the frequency fs_H of the reference light Lo_h, and the frequency shifter 206b shifts the frequency of the H-polarized signal Eh based on the frequency fs_V of the reference light Lo_v. More specifically, the frequency shifter 206a shifts the frequency of the H-polarized signal Eh to a lower frequency by fs_H, and the frequency shifter 206b shifts the frequency of the H-polarized signal Eh to a lower frequency by fs_V.

Accordingly, the frequency shifter 206a generates a first shift signal (see the reference P12), and the frequency shifter 206b generates a second shift signal (see the reference P13). The frequency shifter 206a outputs the I component and the Q component of the first shift signal separately to the MIMO 205, while the frequency shifter 206b outputs the I component and the Q component of the second shift signal separately to the MIMO 205. The frequency shifters 206a and 206b are examples of a first frequency shift unit.

Figure 12:
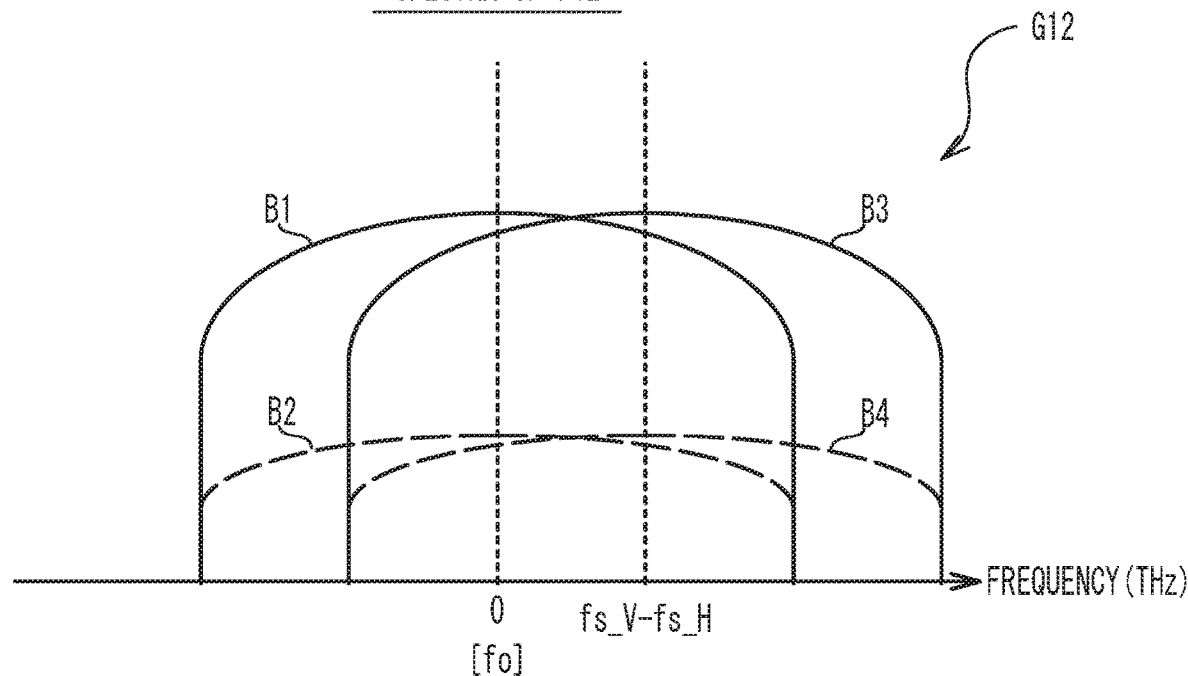
FIG. 12 illustrates examples of the electric spectra of the H-polarized signal and the V-polarized signal.
Figure 12:
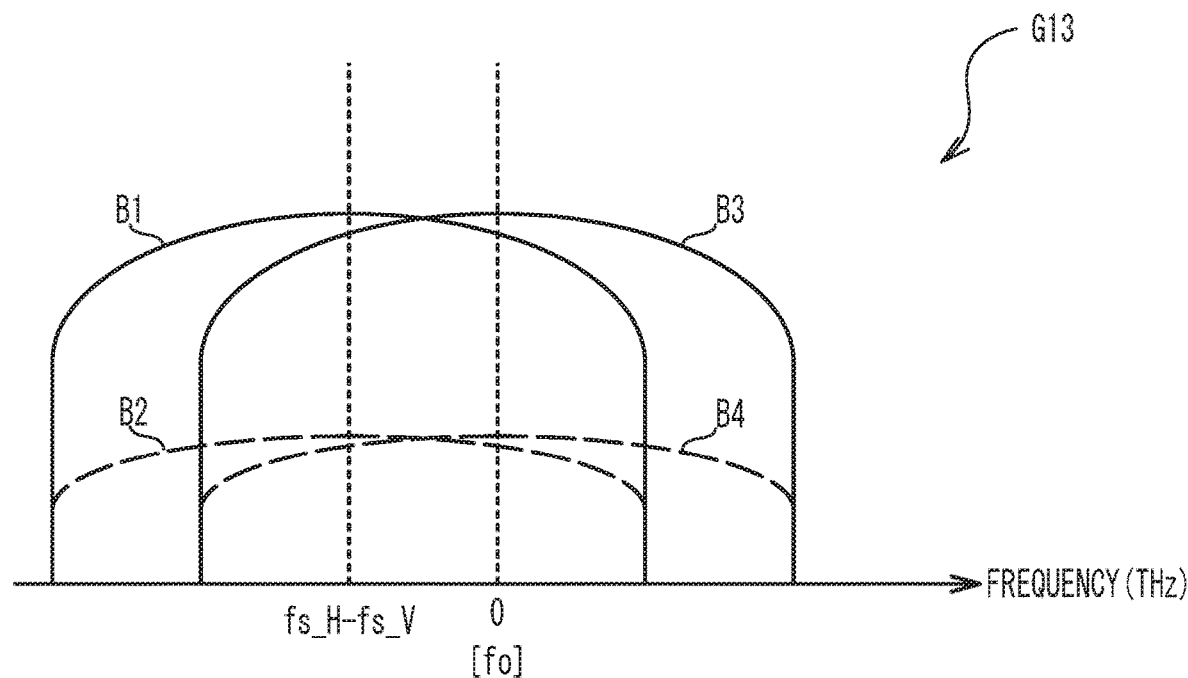

In FIG. 12, the reference G12 indicates the electric spectra of the first shift signal output from the frequency shifter 206a (see the reference P12), and the reference G13 indicates the electric spectra of the second shift signal output from the frequency shifter 206b (see the reference P13). The spectra indicated by the reference G12 correspond to the spectra shifted from the spectra indicated by the reference G11 by the frequency fs_H in the negative direction of the frequency axis. The spectra indicated by the reference G13 correspond to the spectra shifted from the spectra indicated by the reference G11 by the frequency fs_V in the negative direction of the frequency axis.

In the first shift signal, the center frequency of each of the beat signals B1 and B2 is fo, and the center frequency of each of the beat signals B3 and B4 is (fs_V−fs_H). In the second shift signal, the center frequency of each of the beat signals B1 and B2 is (fs_H−fs_V), and the center frequency of each of the beat signals B3 and B4 is fo.

The frequency shifter 206c shifts the frequency of the V-polarized signal Ev based on the frequency fs_H of the reference light Lo_h, while the frequency shifter 206d shifts the frequency of the V-polarized signal Ev based on the frequency fs_V of the reference light Lo_v. More specifically, the frequency shifter 206c shifts the frequency of the V-polarized signal Ev to a lower frequency by fs_H, while the frequency shifter 206d shifts the frequency of the V-polarized signal Ev to a lower frequency by fs_V.

Accordingly, the frequency shifter 206c generates a third shift signal (see the reference P22), and the frequency shifter 206d generates a fourth shift signal (see the reference P23). The frequency shifter 206c outputs the I component and the Q component of the third shift signal separately to the MIMO 205, while the frequency shifter 206d outputs the I component and the Q component of the fourth shift signal separately to the MIMO 205. The frequency shifters 206c and 206d are examples of a second frequency shift unit.

Figure 13:
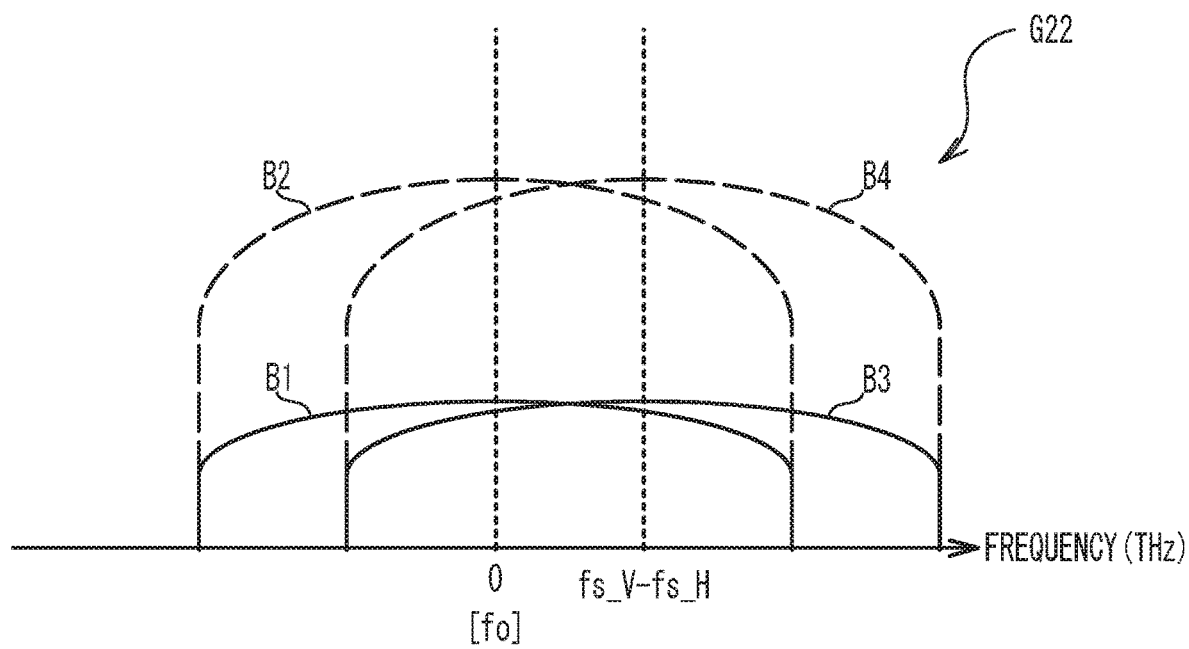
FIG. 13 illustrates examples of the electric spectra of the H-polarized signal and the V-polarized signal.
Figure 13:
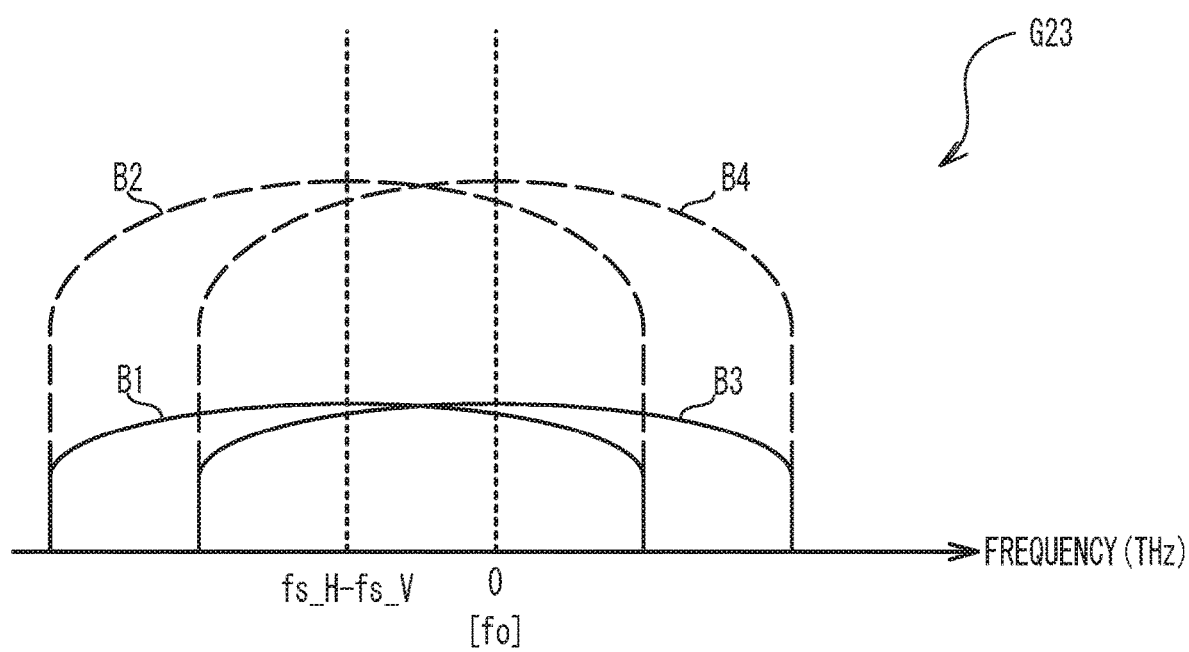

In FIG. 13, the reference G22 indicates the electric spectra of the third shift signal output from the frequency shifter 206c (see the reference P22), and the reference G23 indicates the electric spectra of the fourth shift signal output from the frequency shifter 206d (see the reference P23). The spectra indicated by the reference G22 correspond to the spectra shifted from the spectra indicated by the reference G12 by the frequency fs_H in the negative direction of the frequency axis, and the spectra indicated by the reference G23 correspond to the spectra shifted from the spectra indicated by the reference G12 by the frequency fs_V in the negative direction of the frequency axis.

In the third shift signal, the center frequency of each of the beat signals B1 and B2 is fo, while the center frequency of each of the beat signals B3 and B4 is (fs_V−fs_H). In the fourth shift signal, the center frequency of each of the beat signals B1 and B2 is (fs_H−fs_V), while the center frequency of each of the beat signals B3 and B4 is fo.

The I component and the Q component of each of the first through fourth shift signals are input to the MIMO 205. The number of signal inputs of the MIMO 205 is 8, and the number of signal outputs of the MIMO 205 is 4 (see "8×4").

The MIMO 205 is an example of an extraction unit, and extracts the H-axis signal Sh and the V-axis signal Sv from the first through fourth shift signals. More specifically, the MIMO 205 removes the beat signals B3 and B4 from the first through fourth shift signals by filtering, for example, spectral waveforms. This process reproduces each of the H-axis signal Sh and the V-axis signal Sv from the remaining beat signals B1 and B2. An exemplary configuration of the MIMO 205 will be described later.

Figure 14:
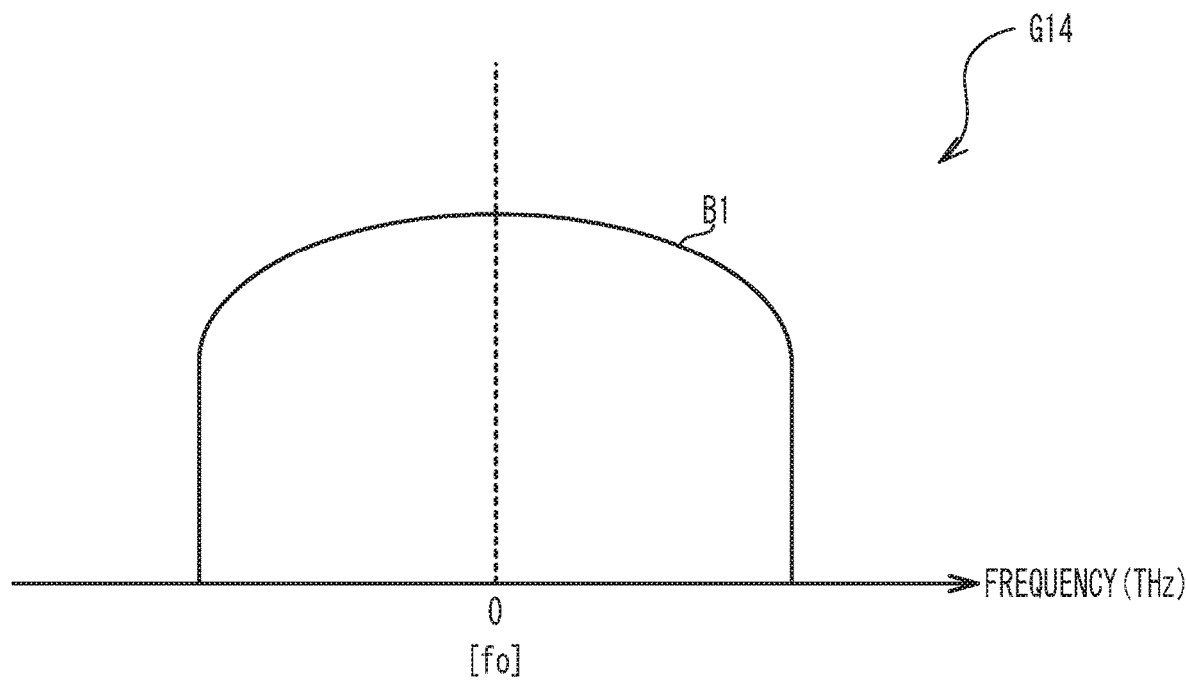
FIG. 14 illustrates examples of the electric spectra of the H-polarized signal and the V-polarized signal.
Figure 14:
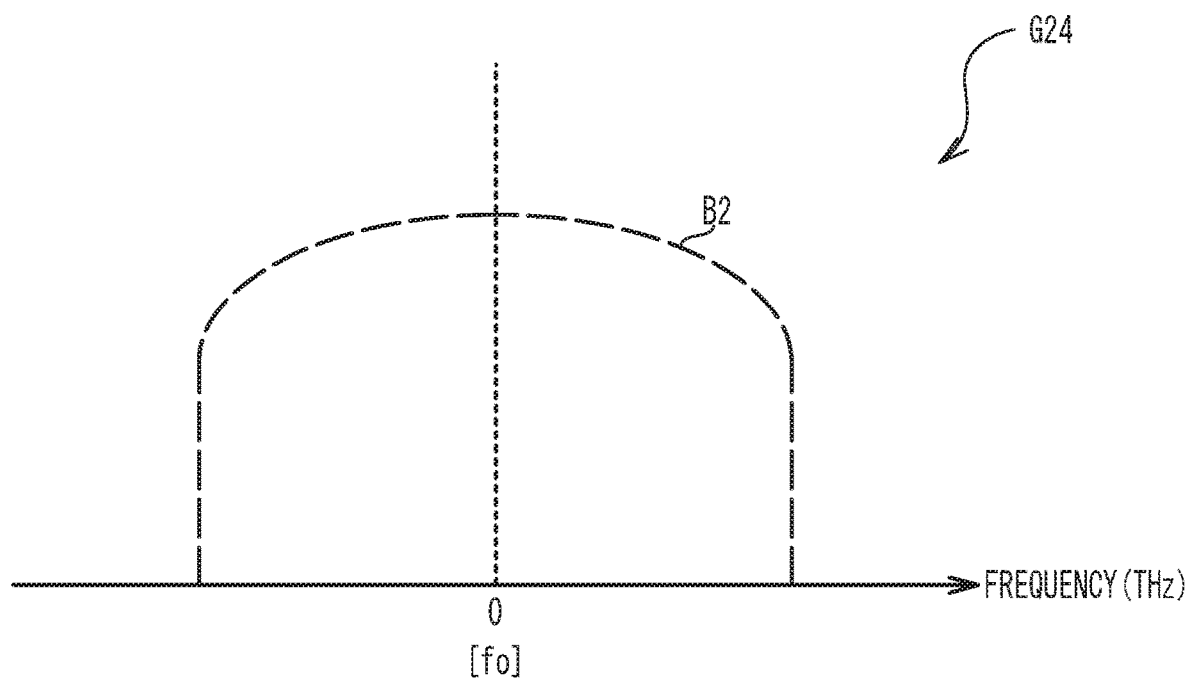

In FIG. 14, the reference G14 indicates the electric spectrum of the beat signal B1 output from the MIMO 205 (see the reference P14), and the reference G24 indicates the electric spectrum of the beat signal B2 output from the MIMO 205 (see the reference P24). The H-axis signal Sh is superimposed on the beat signal B1, and the V-axis signal Sv is superimposed on the beat signal B2. The I component and the Q component of each of the beat signals B1 and B2 are separately input to the phase reproduction unit 204.

The phase reproduction unit 204 corrects the phase rotation in the complex plane of the I component and the Q component of each of the beat signals B1 and B2. The phase reproduction unit 204 corrects the phase rotation so that the H-axis signal Sh and the V-axis signal Sv are normally demodulated by signal constellation (constellation diagram) according to the modulation scheme. The signal constellation displays signal points corresponding to the amplitude and the phase of the signal in the complex plane having a real axis (I) and an imaginary axis (Q). The phase reproduction unit 204 outputs, to the demodulation unit 203, the H-axis signal Sh and the V-axis signal Sv of which the phase rotations have been corrected. The demodulation unit 203 reproduces the data signal Sd by the demodulation process as described above.

In the present example, the number of signal inputs ×the number of signal outputs of the MIMO 205 is 8×4. However, when the first through fourth shift signals respectively output from the frequency shifters 206a through 206d are complex signals, the MIMO 205 of which the number of signal inputs ×the number of signal outputs is 4×2 can be used.

Figure 15:
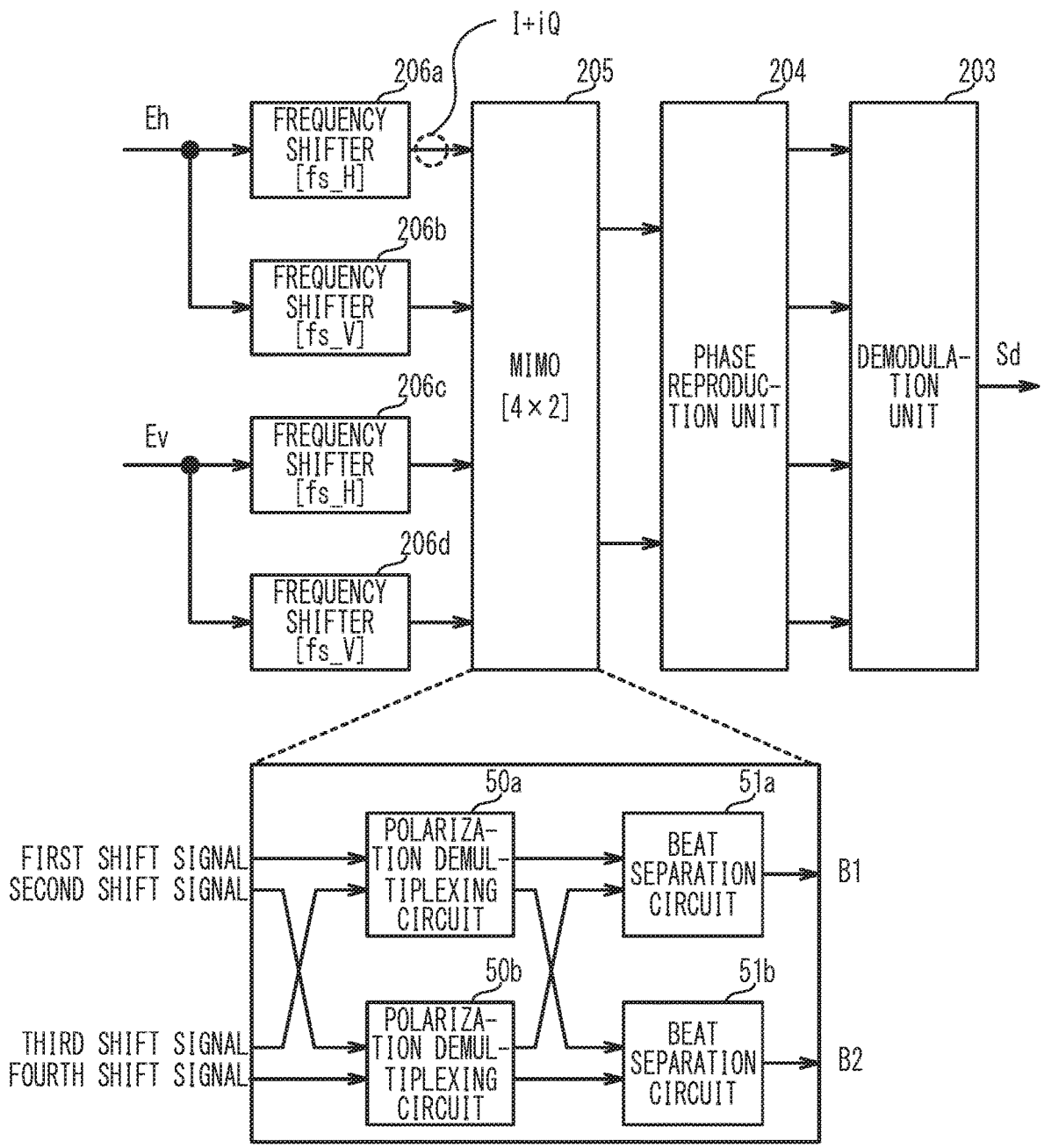
FIG. 15 is a block diagram of another exemplary reception processing circuit.

FIG. 15 is a block diagram illustrating another example of the reception processing circuit 20. In FIG. 15, the same references are affixed to the components common to those of FIG. 10, and the description thereof is omitted.

The frequency shifters 206a through 206d respectively output the first through fourth shift signals as complex signals (see "I+iQ") to the MIMO 205. The MIMO 205 outputs the beat signals B1 and B2 as complex signals to the phase reproduction unit 204. Thus, the number of signal inputs ×the number of signal outputs of the MIMO 205 is 4×2.

FIG. 15 also illustrates an exemplary configuration of the MIMO 205. The MIMO 205 includes polarization demultiplexing circuits 50a and 50b and beat separation circuits 51a and 51b. The first shift signal and the third shift signal are input to the polarization demultiplexing circuit 50a, and the second shift signal and the fourth shift signal are input to the polarization demultiplexing circuit 50b.

The polarization demultiplexing circuit 50a filters out the H-polarized components and the V-polarized components from the first shift signal and the third shift signal, and the polarization demultiplexing circuit 50b filters out the H-polarized components and the V-polarized components from the second shift signal and the fourth shift signal. Each of the polarization demultiplexing circuits 50a and 50b outputs the H-polarized component to the beat separation circuit 51a and the V-polarized component to the beat separation circuit 51b.

The beat separation circuit 51a extracts the beat signal B1 by filtering the H-polarized components input from the polarization demultiplexing circuits 50a and 50b. The beat separation circuit 51b extracts the beat signal B2 by filtering the V-polarized components from the polarization demultiplexing circuit 50a and 50b.

The polarization demultiplexing circuits 50a and 50b and the beat separation circuits 51a and 51b are composed of, for example, finite impulse response (FIR) filters having a butterfly configuration.

Figure 16:
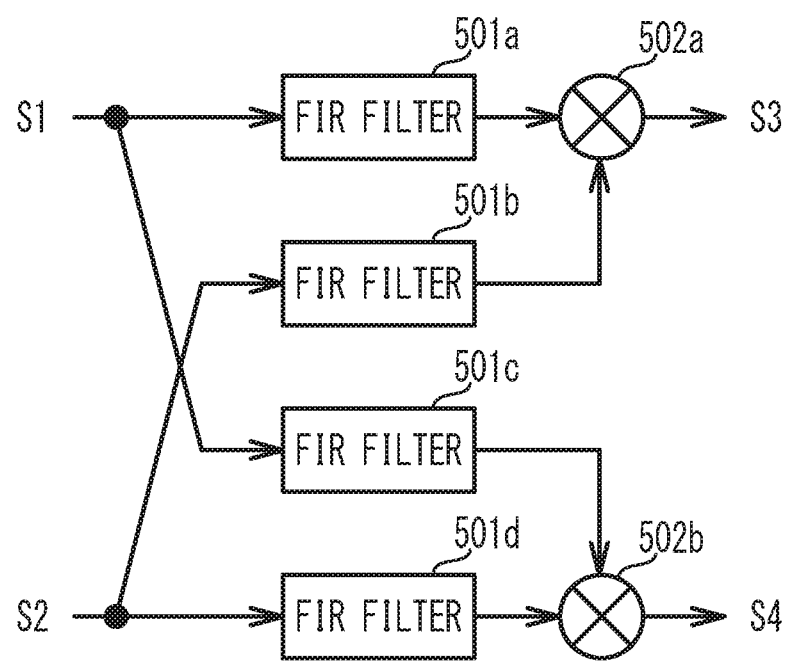
FIG. 16 is a block diagram of an exemplary circuit having a butterfly configuration.

FIG. 16 is a block diagram illustrating an exemplary circuit having the butterfly configuration. The circuit having the butterfly configuration includes, for example, FIR filters 501a through 501d and multipliers 502a and 502b.

An input signal S1 is input to the FIR filters 501a and 501c, while an input signal S2 is input to the FIR filters 501b and 501d. Signals output from the FIR filters 501a and 501b are superimposed by the multiplier 502a, and the superimposed signal is output as an output signal S3. Signals output from the FIR filters 501c and 501d are superimposed by the multiplier 502b, and the superimposed signal is output as an output signal S4. The tap coefficients of the FIR filters 501a through 501d are controlled by an unillustrated processor by means of adaptive equalization.

Figure 17:
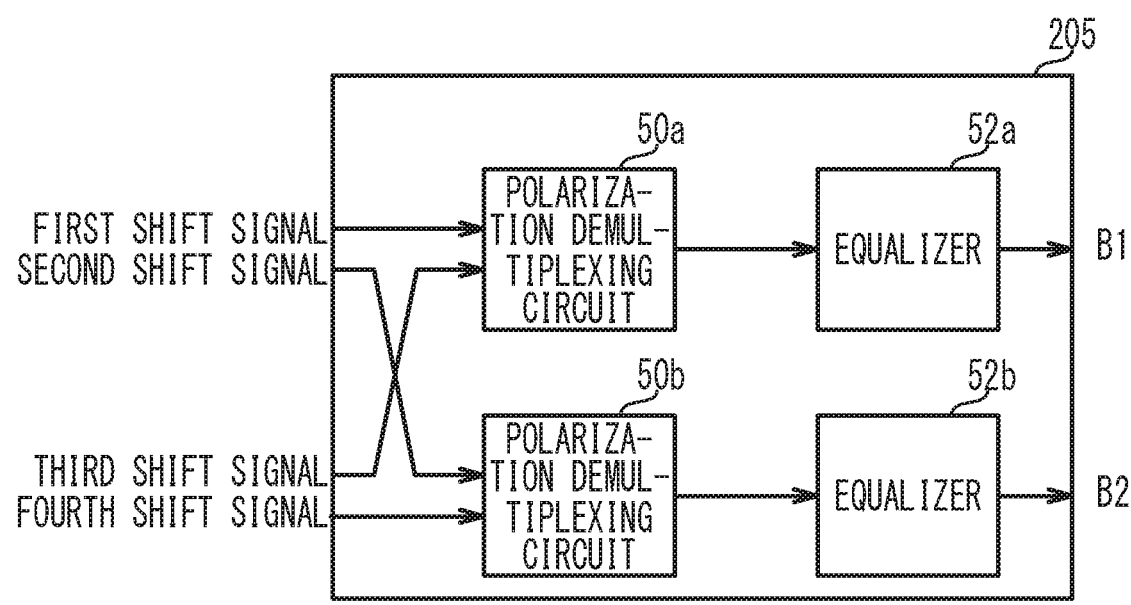
FIG. 17 is a block diagram of a variation of a Multiple-In Multiple-Out (MIMO)

FIG. 17 is a block diagram illustrating a variation of the MIMO 205. The MIMO 205 includes equalizers 52a and 52b instead of the beat separation circuits 51a and 51b. The equalizer 52a is supplied with the H-polarized component from the polarization demultiplexing circuit 50a, and the equalizer 52b is supplied with the V-polarized component from the polarization demultiplexing circuit 50b. The equalizers 52a and 52b respectively extract the beat signals B1 and B2 by performing a filtering process by means of adaptive equalization based on a predetermined training sequence.

The configuration of the frequency shifters 206a through 206d of the reception processing circuit 20 are not limited to the above configuration.

Figure 18:
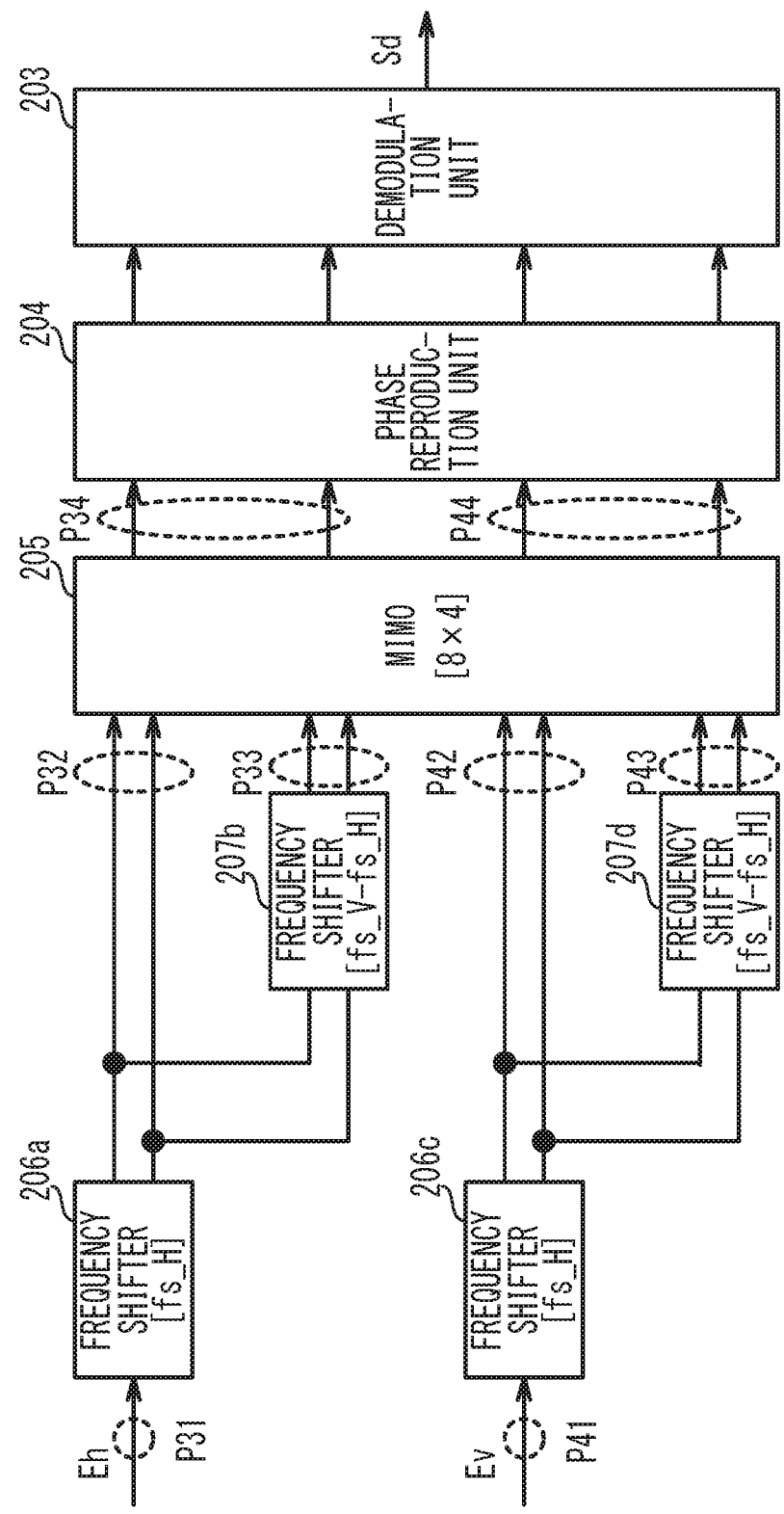
FIG. 18 is a block diagram of yet another exemplary reception processing circuit.

FIG. 18 is a block diagram illustrating yet another example of the reception processing circuit 20. In FIG. 18, the same references are affixed to the components common to those of FIG. 10, and the description thereof is omitted. The reception processing circuit 20 of the present example includes frequency shifters 207b and 207d instead of the frequency shifters 206b and 206d.

The frequency shifter 206a is supplied with the H-polarized signal Eh, and the frequency shifter 206c is supplied with the V-polarized signal Ev. The spectra of the H-polarized signal Eh input to the frequency shifter 206a (see the reference P31) and the V-polarized signal Ev input to the frequency shifter 206c (see the reference P41) are the same as those indicated by the references G11 and G21 in FIG. 11, respectively.

The H-polarized signal Eh is frequency-shifted by the frequency shifter 206a, and is then split and input to the MIMO 205 and the frequency shifter 207b. The frequency shifter 207b shifts the frequency of the H-polarized signal Eh to a lower frequency by (fs_V−fs_H). Accordingly, the frequency shifter 207b generates the second shift signal having a frequency shifted from the frequency of the H-polarized signal Eh by fs_V. As described above, the frequency shifter 207b generates the second shift signal by frequency-shifting the first shift signal generated by the frequency shifter 206a.

Thus, as in the example of FIG. 10, the MIMO 205 is supplied with the first shift signal from the frequency shifter 206a, and with the second shift signal from the frequency shifter 207b. The spectra of the first shift signal input to the MIMO 205 (see the reference P32) and the second shift signal (see the reference P33) input to the MIMO 205 are the same as those indicated by the references G12 and G13 in FIG. 12, respectively.

The V-polarized signal Ev is frequency-shifted by the frequency shifter 206c, and is then split and input to the MIMO 205 and the frequency shifter 207d. The frequency shifter 207d shifts the frequency of the V-polarized signal Ev to a lower frequency by (fs_V−fs_H). Accordingly, the frequency shifter 207b generates the fourth shift signal having a frequency shifted from the frequency of the V-polarized signal Ev by fs_V. As described above, the frequency shifter 207d generates the fourth shift signal by frequency-shifting the third shift signal generated by the frequency shifter 206c.

Thus, as in the example of FIG. 10, the MIMO 205 is supplied with the third shift signal from the frequency shifter 206c, and with the fourth shift signal from the frequency shifter 207d. The spectra of the third shift signal input to the MIMO 205 (see the reference P42) and the fourth shift signal (see the reference P43) input to the MIMO 205 are the same as those indicated by the references G22 and G23 in FIG. 13, respectively.

The MIMO 205 extracts the beat signal B1 and the beat signal B2, and outputs the beat signal B1 and the beat signal B2 to the phase reproduction unit 204. The spectrum of the beat signal B1 (see the reference P34) and the spectrum of the beat signal B2 (see the reference P44) are the same as those indicated by the references G14 and G24 in FIG. 14, respectively.

In the reception processing circuit 20 described above, the frequency shifters 206a through 206d, 207b, and 207d are used for frequency-shifting, but costas loop circuits may be employed instead.

Figure 19:
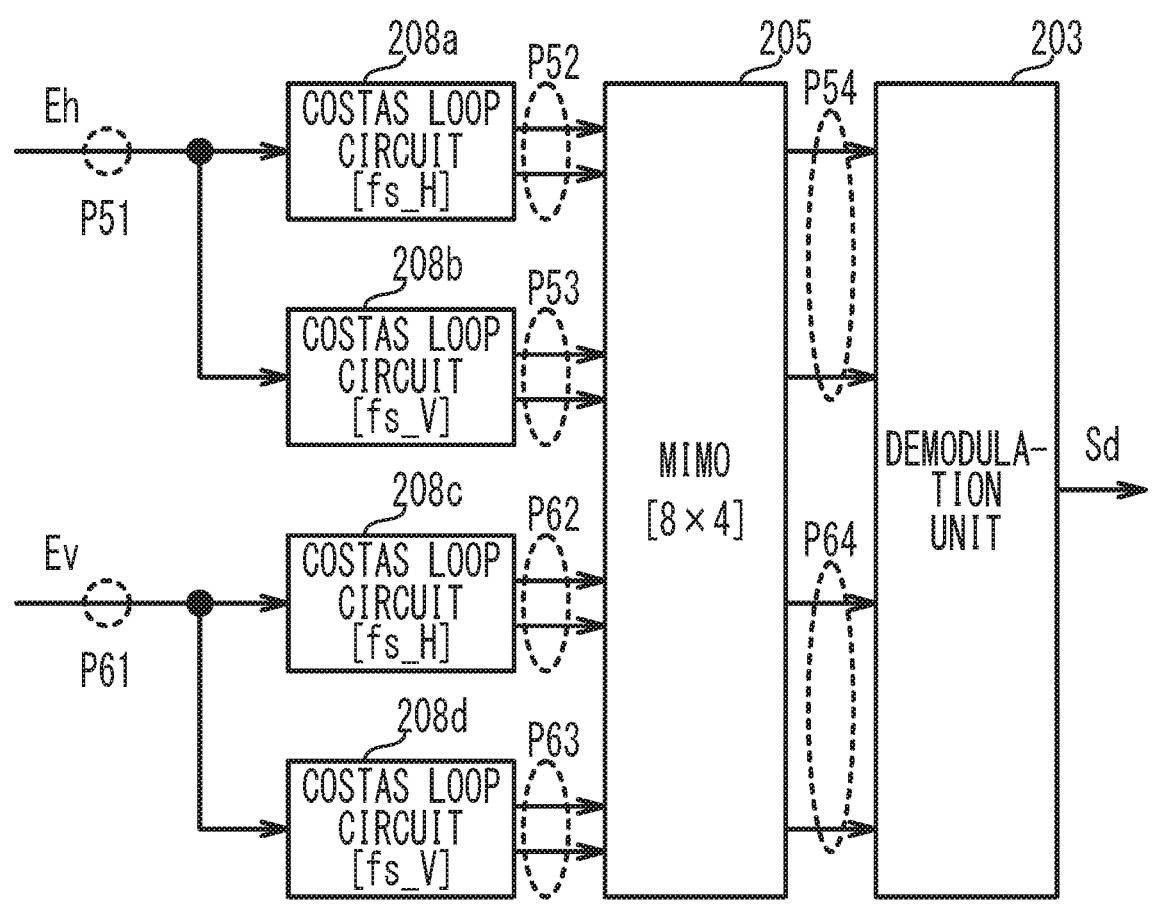
FIG. 19 is a block diagram of yet another exemplary reception processing circuit.

FIG. 19 is a block diagram illustrating yet another example of the reception processing circuit 20. In FIG. 19, the same references are affixed to the components common to those in FIG. 10, and the description thereof is omitted.

The reception processing circuit 20 of this example includes costas loop circuits 208a through 208d instead of the frequency shifters 206a through 206d. The costas loop circuits 208a through 208d have the same circuit configuration as the costas loop circuits 200 and 201 in FIG. 4. The VCO 216 of each of the costas loop circuits 208a and 208c oscillates at the frequency fs_H of the reference light Lo_h (i.e., fc=fs_H), while the VCO 216 of each of the costas loop circuits 208b and 208d oscillates at the frequency fs_V of the reference light Lo_v (i.e., fc=fs_H). The VCO 216 is an example of an oscillator.

The H-polarized signal Eh is input to each of the costas loop circuits 208a and 208b, while the V-polarized signal Ev is input to each of the costas loop circuits 208c and 208d. The spectra of the H-polarized signal Eh (see the reference P51) and the V-polarized signal Ev (see the reference P61) are the same as those indicated by the references G11 and G21 in FIG. 11, respectively. The costas loop circuits 208a and 208b are examples of a first costas loop circuit, while the costas loop circuits 208c and 208d are examples of a second costas loop circuit.

The costas loop circuit 208a generates the first shift signal by detecting the H-polarized signal Eh based on the frequency fs_H, while the costas loop circuit 208b generates the second shift signal by detecting the H-polarized signal Eh based on the frequency fs_V. The first shift signal and the second shift signal are input to the MIMO 205. The spectra of the first shift signal (see the reference P52) and the second shift signal (see the reference P53) are the same as those indicated by the references G12 and G13 in FIG. 12, respectively.

The costas loop circuit 208c generates the third shift signal by detecting the V-polarized signal Ev based on the frequency fs_H, while the costas loop circuit 208d generates the fourth shift signal by detecting the V-polarized signal Ev based on the frequency fs_V. The third shift signal and the fourth shift signal are input to the MIMO 205. The spectra of the third shift signal (see the reference P62) and the spectra of the second shift signal (see reference P63) are the same as those indicated by the references G22 and G23 in FIG. 13, respectively.

The MIMO 205 extracts the beat signal B1 and the beat signal B2, and outputs the beat signal B1 and the beat signal B2 to the demodulation unit 203. The spectrum of the beat signal B1 (see the reference P54) and the spectrum of the beat signal B2 (see the reference P64) are the same as those indicated by the references G14 and G24 in FIG. 14, respectively.

In this example, since the costas loop circuits 208a through 208d decode the I component and the Q component, the above phase reproduction unit 204 is not necessary.

As described above, the transmitter 1 and the receiver 2 of the embodiment are able to reduce deterioration in transmission quality due to change in the polarization state of the polarization multiplexed optical signal Smux. The transmit method and the receive method of the embodiment are executed by the transmitter 1 and the receiver 2, and thus have the same advantage as the transmitter 1 and the receiver 2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A receiver receiving a polarization multiplexed optical signal in which a first polarized light and a second polarized light are multiplexed, the receiver comprising:
   a polarization beam splitter configured to demultiplex the first polarized light and the second polarized light from the polarization multiplexed optical signal, the first polarized light containing a first signal light and a second signal light having less power than the first signal light, a first signal being superimposed on the first signal light, the second polarized light containing the second signal light and the first signal light having less power than the second signal light, a second signal being superimposed on the second signal light;
   a first detector circuit configured to convert the first polarized light to a first electric signal;
   a second detector circuit configured to convert the second polarized light to a second electric signal;
   a first frequency shift circuit configured to generate a first shift signal by shifting a frequency of the first electric signal, and generate a second shift signal by shifting the frequency of the first electric signal;
   a second frequency shift circuit configured to generate a third shift signal by shifting a frequency of the second electric signal, and generate a fourth shift signal by shifting the frequency of the second electric signal; and
   an extraction circuit configured to extract the first signal and the second signal from the first shift signal, the second shift signal, the third shift signal, and the fourth shift signal.

2. The receiver according to claim 1, wherein each of the first frequency shift circuit and the second frequency shift circuit includes an oscillator oscillating at a frequency carried by the first polarized light and another oscillator oscillating at a frequency carried by the second polarized light.

3. The receiver according to claim 1, wherein the extraction circuit includes FIR (Finite Impulse Response) filters to extract the first signal and the second signal by filtering the first shift signal, the second shift signal, the third shift signal, and the fourth shift signal.

4. A receiving method for receiving a polarization multiplexed optical signal in which a first polarized light and a second polarized light are multiplexed, the receiving method comprising:
   demultiplexing the first polarized light and the second polarized light from the polarization multiplexed optical signal, the first polarized light containing a first signal light and a second light signal having less power than the first signal light, a first signal being superimposed on the first signal light, the second polarized light containing the second signal light and the first signal light having less power than the second signal light, a second signal being superimposed on the second signal light;
   converting the first polarized light to a first electric signal;
   converting the second polarized light to a second electric signal;
   generating a first shift signal by shifting a frequency of the first electric signal;
   generating a second shift signal by shifting the frequency of the first electric signal;
   generating a third shift signal by shifting a frequency of the second electric signal;
   generating a fourth shift signal by shifting the frequency of the second electric signal; and
   extracting the first signal and the second signal from the first shift signal, the second shift signal, the third shift signal, and the fourth shift signal.

5. The receiving method according to claim 4, wherein the first shift signal and the third shift signal are generated by an oscillator oscillating at a frequency carried by the first polarized light and, and the second shift signal and the fourth shift signal are generated by another oscillator oscillating at a frequency carried by the second polarized light.

6. The receiving method according to claim 4, wherein extracting the first signal and the second signal by FIR (Finite Impulse Response) filters filtering the first shift signal, the second shift signal, the third shift signal, and the fourth shift signal.

* * * * *